United States Patent
Groninga et al.

(10) Patent No.: US 10,479,495 B2
(45) Date of Patent: Nov. 19, 2019

(54) AIRCRAFT TAIL WITH CROSS-FLOW FAN SYSTEMS

(71) Applicant: Bell Helicopter Textron Inc., Fort Worth, TX (US)

(72) Inventors: Kirk L. Groninga, Keller, TX (US); Daniel B. Robertson, Southlake, TX (US); Matthew E. Louis, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 515 days.

(21) Appl. No.: 15/483,652

(22) Filed: Apr. 10, 2017

(65) Prior Publication Data
US 2018/0044010 A1    Feb. 15, 2018

Related U.S. Application Data

(63) Continuation-in-part of application No. 15/252,916, filed on Aug. 31, 2016, now Pat. No. 10,106,253, and
(Continued)

(51) Int. Cl.
*B64C 27/82* (2006.01)
*B64C 27/06* (2006.01)
(Continued)

(52) U.S. Cl.
CPC ............ *B64C 27/82* (2013.01); *B64C 27/06* (2013.01); *F04D 17/04* (2013.01); *F04D 25/166* (2013.01);
(Continued)

(58) Field of Classification Search
CPC ....... B64C 11/006; B64C 23/02; B64C 27/06; B64C 27/82; B64C 39/006;
(Continued)

(56) References Cited

U.S. PATENT DOCUMENTS 516,581 A * 3/1894 Wellner ................ B64C 11/006
                                                              416/108
1,487,228 A   3/1924 Garcia
(Continued)

FOREIGN PATENT DOCUMENTS

CA        2976079 C    4/2019
CN     204674831 U    9/2015
(Continued)

OTHER PUBLICATIONS

English language machine translation of Japanese Unexamined Pat. Pub. No. 2009-051381 to Mitsubishi Heavy Ind Ltd. (reference originally in IDS filed on Aug. 22, 2018).*
(Continued)

*Primary Examiner* — Claude J Brown
(74) *Attorney, Agent, or Firm* — Timmer Law Group, PLLC

(57) ABSTRACT

In one aspect, there is provided an aircraft, including a fuselage having a longitudinal axis extending from a front portion through an aft portion; first and second tail members extending from the aft portion; a first cross-flow fan system rotatably mounted to the first tail member; and a second cross-flow fan system rotatably mounted to the second tail member. The first and second cross-flow fan systems are configured to provide a forward thrust vector and an anti-torque vector on the aircraft. The first and second cross-flow fan systems can have a rotational axis oriented generally vertically. In another aspect, there is an aircraft including a fuselage having a front portion and a tail portion; and a cross-flow fan system supported by the tail portion. Embodiments include a cross-flow fan system retrofittable onto an aircraft and methods for retrofitting an aircraft with a cross-flow fan system.

23 Claims, 23 Drawing Sheets

Related U.S. Application Data a continuation-in-part of application No. 15/233,897, filed on Aug. 10, 2016, now Pat. No. 10,279,900.

(51) Int. Cl.
    *F04D 17/04*      (2006.01)
    *F04D 25/16*      (2006.01)
    *F04D 27/00*      (2006.01)
    *F04D 29/42*      (2006.01)

(52) U.S. Cl.
    CPC ....... *F04D 27/002* (2013.01); *F04D 29/4226* (2013.01); *B64C 2027/8227* (2013.01)

(58) Field of Classification Search
    CPC .... B64C 2027/8227; B64C 2027/8218; B64C 2027/8254; F04D 27/002; F04D 29/4226; F04D 25/166; F04D 17/04
    USPC .......................................................... 244/9
    See application file for complete search history.

(56) References Cited

U.S. PATENT DOCUMENTS

| | | | |
|---|---|---|---|
| 1,761,053 A | 6/1930 | Rystedt | |
| 1,796,016 A | 3/1931 | Frickle | |
| 1,885,640 A * | 11/1932 | Strandgren | B64C 11/006 416/108 |
| 1,893,621 A * | 1/1933 | Hansen | B64C 11/006 416/108 |
| 2,250,772 A | 7/1941 | Hans | |
| 3,065,928 A | 11/1962 | Dormier | |
| 3,212,735 A | 10/1965 | Laing | |
| 4,194,707 A | 3/1980 | Shame | |
| 4,752,258 A * | 6/1988 | Hochleitner | B63H 1/10 416/108 |
| 5,100,080 A | 3/1992 | Servanty | |
| 6,007,021 A | 12/1999 | Tsepenyuk | |
| 6,352,219 B1 * | 3/2002 | Zelic | B64C 11/006 244/12.1 |
| 6,932,296 B2 * | 8/2005 | Tierney | B64B 1/30 244/12.2 |
| 7,219,854 B2 | 5/2007 | Boschma | |
| 7,518,864 B2 | 4/2009 | Kimura | |
| 7,594,625 B2 | 9/2009 | Robertson et al. | |
| 7,641,144 B2 | 1/2010 | Kummer et al. | |
| 7,731,121 B2 | 6/2010 | Smith et al. | |
| 7,931,233 B2 | 4/2011 | Arafat et al. | |
| 8,448,905 B2 | 5/2013 | Peebles | |
| 8,469,308 B2 | 6/2013 | Robertson et al. | |
| 8,528,855 B2 | 9/2013 | Seifert | |
| 8,636,243 B2 | 1/2014 | Robertson | |
| 8,727,265 B2 | 5/2014 | Altmikus et al. | |
| 9,260,185 B2 | 2/2016 | Covington et al. | |
| 9,346,535 B1 | 5/2016 | Adams | |
| 9,409,643 B2 | 8/2016 | Mores et al. | |
| 9,452,832 B2 | 9/2016 | Heid | |
| 10,377,480 B2 | 8/2019 | Groninga et al. | |
| 2005/0274843 A1 * | 12/2005 | Schwaiger | B64C 39/008 244/21 |
| 2006/0249621 A1 | 11/2006 | Stephens | |
| 2007/0200029 A1 | 8/2007 | Sullivan | |
| 2010/0150714 A1 * | 6/2010 | Kolacny | F04D 17/04 415/224 |
| 2011/0101173 A1 | 5/2011 | Peebles | |
| 2012/0032447 A1 * | 2/2012 | Bang-Moeller | F03D 1/04 290/54 |
| 2012/0091257 A1 | 4/2012 | Wolff et al. | |
| 2012/0111994 A1 | 5/2012 | Kummer et al. | |
| 2012/0234968 A1 | 9/2012 | Smith | |
| 2012/0256042 A1 * | 10/2012 | Altmikus | B64C 27/82 244/17.21 |
| 2012/0312916 A1 | 12/2012 | Groninga | |
| 2013/0119186 A1 | 5/2013 | Heid | |
| 2015/0197335 A1 | 7/2015 | Dekel et al. | |
| 2016/0152334 A1 * | 6/2016 | Prisell | B64C 15/02 244/73 R |
| 2016/0214710 A1 | 7/2016 | Brody et al. | |
| 2016/0376003 A1 | 12/2016 | Feldman | |
| 2018/0044012 A1 | 2/2018 | Groninga et al. | |
| 2018/0044013 A1 | 2/2018 | Groninga et al. | |

FOREIGN PATENT DOCUMENTS

| | | |
|---|---|---|
| CN | 104276284 B | 4/2016 |
| EP | 0393752 A1 | 10/1990 |
| EP | 2511177 A1 | 10/2012 |
| EP | 2808253 A1 | 12/2014 |
| EP | 3281863 A1 | 2/2018 |
| EP | 3281865 A1 | 2/2018 |
| EP | 3281865 B1 | 10/2018 |
| EP | 3281863 B1 | 12/2018 |
| FR | 636843 A | 4/1928 |
| FR | 2375090 A1 | 7/1978 |
| GB | 885663 A | 12/1961 |
| GB | 2316374 A | 2/1998 |
| JP | 2009-51381 A | 3/2009 |
| WO | 2007106137 A1 | 9/2007 |

OTHER PUBLICATIONS

European Search Report, Application No. 16188806.0, European Patent Office, dated Aug. 8, 2017.
EP Communication under Rule 71(3)—Intention to Grant, dated Jul. 20, 2018, by the EPO, re EP Patent Application No. 17185544.8.
European Examination Report, Application No. 16188806.0, European Patent Office, dated Aug. 30, 2017.
European Search Report, dated Jan. 12, 2018, by the EPO, regarding EP Application No. 17185544.8.
European Exam Report, dated Jan. 9, 2018, by the EPO, regarding EP Application No. 17185578.6.
European Examination Report, dated Jan. 26, 2018, by the EPO, re EP Patent App No. 16188806.0.
EP Communication under Rule 71(3)—Intention to Grant, dated Sep. 4, 2018, by the EPO, re EP Patent Application No. 17185578.6.
Decision to Grant, dated Sep. 20, 2018, by the EPO, re EP Patent App No. 17185544.8.
CA Office Action, dated Oct. 2, 2018, by the CIPO, re CA Patent App No. 2,976,077.
Decision to Grant, dated Nov. 22, 2018, by the EPO, re EP Patent App No. 17185578.6.
CA Notice of Allowance, dated Jan. 9, 2019, by the CIPO, re CA Patent App No. 2,976,079.
European Search Report, dated Dec. 14, 2017, by the EPO, re EP application No. 17185578.6.
European Examination Report, dated Dec. 5, 2017, by the EPO, re EP application No. 17163296.1.
Notice of Allowance, dated May 30, 2019, by the USPTO, re U.S. Appl. No. 15/483,602.
Office Action, dated Feb. 28, 2019, by the USPTO, re U.S. Appl. No. 15/483,602.
Office Action, dated Mar. 8, 2019, by the USPTO, re U.S. Appl. No. 15/483,541.
Notice of Allowance, dated Jul. 5, 2019, by the USPTO, re U.S. Appl. No. 15/483,541.

\* cited by examiner

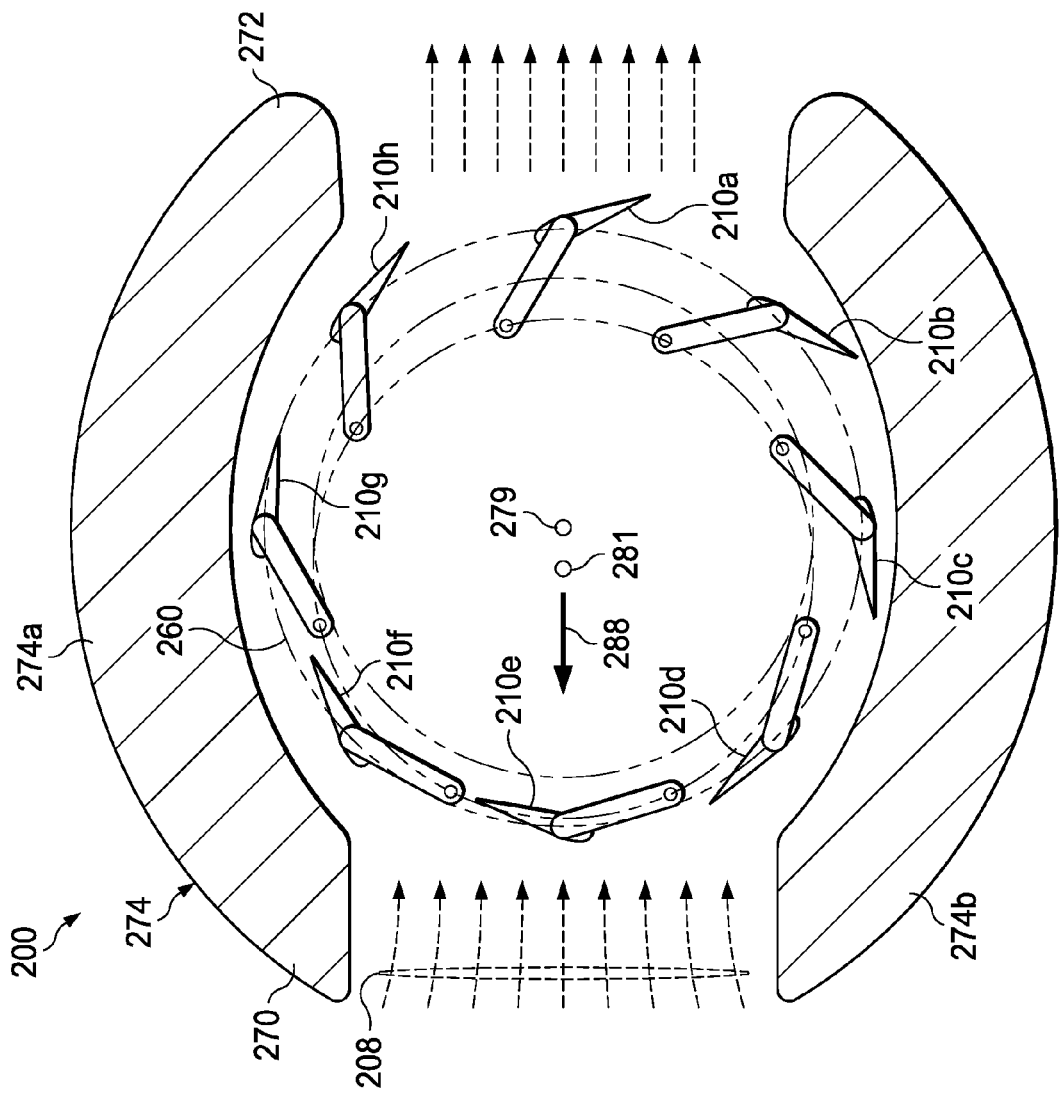

AIRCRAFT TAIL WITH CROSS-FLOW FAN SYSTEMS

CROSS-REFERENCE TO RELATED APPLICATIONS

This application claims priority as a continuation of to U.S. patent application Ser. No. 15/233,897, filed Aug. 10, 2016, and U.S. patent application Ser. No. 15/252,916 filed Aug. 31, 2016. Each patent application identified above is incorporated herein by reference in its entirety.

BACKGROUND

Technical Field

The present disclosure relates, in general, to an aircraft tail with cross-flow fan systems and, in particular, to cross-flow fan systems supported by a tail section of an aircraft.

Description of Related Art

The main rotor of a helicopter, which produces lift necessary for flight, also produces a counteracting torque force on the fuselage of the helicopter. The helicopter's tail rotor, located to the rear of the main rotor, is used to counteract this torque and to control the yaw of the helicopter. Tail rotors are typically mounted on a horizontal axis perpendicular to the direction of flight of the aircraft. The blades of a tail rotor typically change pitch to control thrust direction and intensity.

Traditional tail rotors have several drawbacks. First, because the tail rotor blades are large and openly exposed, they are susceptible to striking people or other objects while in operation. Second, the noise produced by traditional tail rotors can be unacceptably high, creating flyover acoustic problems. Such noise may be undesirable in a low noise environment or during clandestine activities. Traditional tail rotors may also create undesirable profile drag during flight, and/or cause thrust reduction during sideward flight.

Accordingly, the need has arisen for improved anti-torque systems for use on aircraft that have a reduced noise signature, a reduced impact risk, and a reduced profile drag while also providing thrust in more than one direction.

SUMMARY

In one aspect, there is an aircraft, including a fuselage having a longitudinal axis extending from a front portion through an aft portion; first and second tail members extending from the aft portion; a first cross-flow fan system rotatably mounted to the first tail member; and a second cross-flow fan system rotatably mounted to the second tail member.

In an embodiment, the first and second cross-flow fan systems are configured to provide a forward thrust vector on the aircraft.

In another embodiment, the first and second cross-flow fan systems are configured to provide yaw control for the aircraft.

In one embodiment, the first and second cross-flow fan systems are configured to provide an anti-torque vector on the aircraft.

In still another embodiment, the first and second cross-flow fan systems are each configured to rotate about a rotational axis.

In yet another embodiment, the rotational axis is generally perpendicular to the longitudinal axis of the fuselage.

In an embodiment, the rotational axis intersects a plane transverse of the fuselage longitudinal axis.

In another embodiment, the first and second cross-flow fan systems each include a variable thrust cross-flow fan assembly associated with a shroud.

In an embodiment, the variable thrust cross-flow fan assembly includes at least one variable thrust cross-flow fan assembly unit.

In one embodiment, the variable thrust cross-flow fan assembly unit having a longitudinal axis and including a first and second driver plates having a plurality of blades rotatably mounted therebetween, the plurality of blades disposed radially outwardly from the longitudinal axis such that the plurality of blades have a generally circular path of travel when the cross-flow fan assembly rotates about the longitudinal axis, the plurality of blades moveable between a plurality of pitch angle configurations, and a control assembly coupled to the plurality of blades, the control assembly operable to change the pitch angle configuration of the plurality of blades to generate a variable thrust.

In still another embodiment, the control assembly further includes a control cam that is operable to rotate relative to the first and second driver plates.

In yet another embodiment, the control assembly further includes a control cam that is substantially non-rotatable relative to the first and second driver plates.

In an embodiment, the longitudinal axis of the variable thrust cross-flow fan assembly is perpendicular to the longitudinal axis of the fuselage.

In one embodiment, the longitudinal axis of the variable thrust cross-flow fan assembly intersects a plane transverse of the fuselage longitudinal axis.

In another embodiment, the shroud includes an outer housing and an inner housing, each of the outer housing and the outer housing having an exterior aerodynamic surface.

In a second aspect, there is an aircraft, including a fuselage having a front portion and a tail portion; and a cross-flow fan system supported by the tail portion. The cross-flow fan system can be rotatably coupled to the tail portion.

In an embodiment, the cross-flow fan system is a variable thrust cross-flow fan system.

In one embodiment, the cross-flow fan system is configured to rotate about a rotational axis, the rotational axis is generally perpendicular to a longitudinal axis of the fuselage.

In a third aspect, there is provided a cross-flow fan system configured to be retrofittable onto an aircraft including a variable thrust cross-flow fan assembly associated with a rotatable shroud.

In an embodiment, during operation, airflow through the cross-flow fan system produces a forward thrust vector on the aircraft.

In another embodiment, during operation, airflow through the cross-flow fan system produces an anti-torque vector on the aircraft.

In a fourth aspect, there is a method for retrofitting an aircraft with a cross-flow fan system, the method including providing a cross-flow fan system; and connecting the cross-flow fan system to a drive system of the aircraft so that, during normal operation, the drive system provides power to the cross-flow fan system.

In an embodiment, the method for retrofitting includes mounting the cross-flow fan system to a tail portion of the aircraft.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 7A-7E are schematic illustrations of the blades of a variable thrust cross-flow fan system producing variable thrust in accordance with exemplary embodiments of the present disclosure;

DESCRIPTION OF THE PREFERRED EMBODIMENT

Figure 1A:
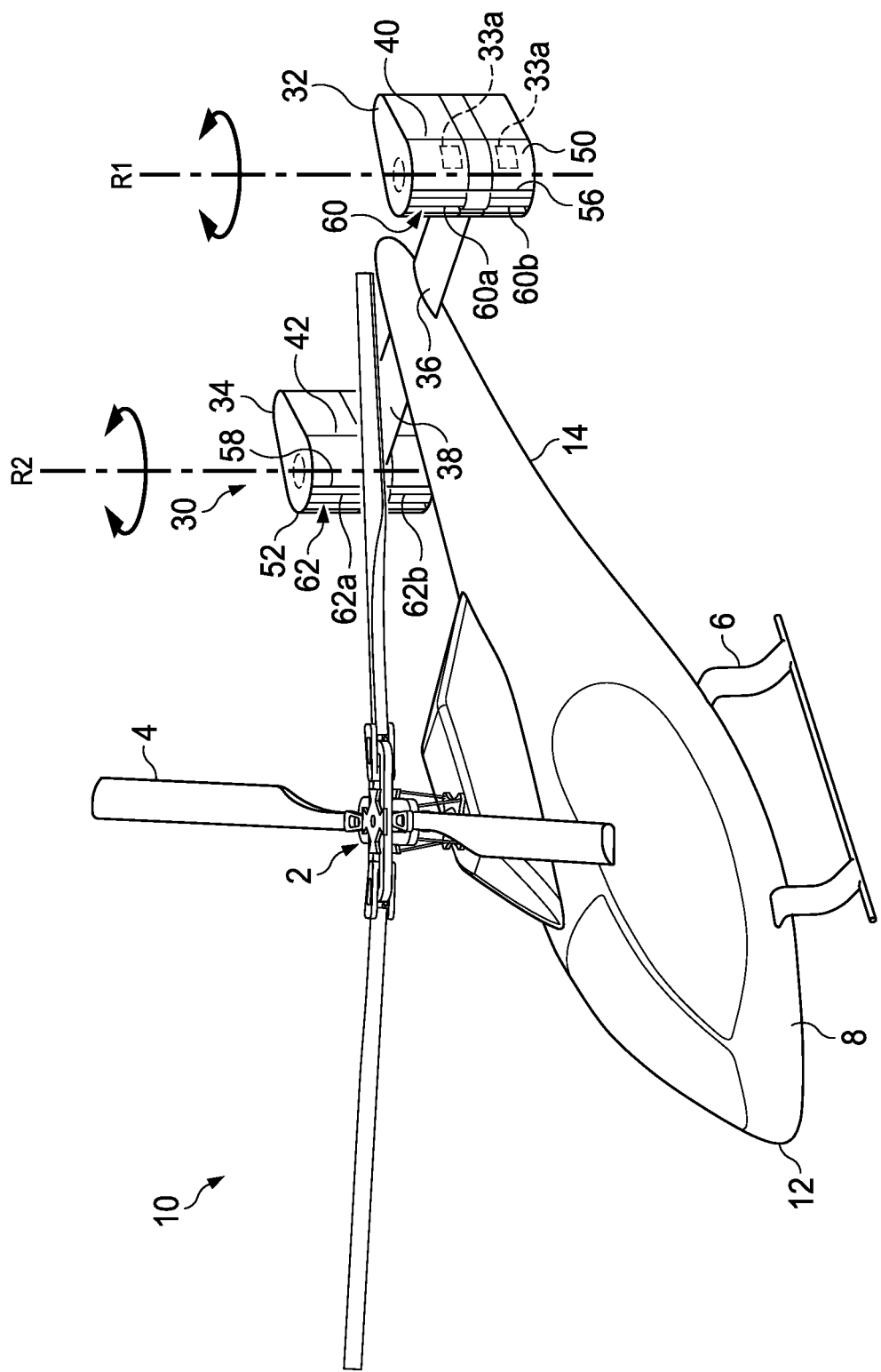
FIGS. 1A-1D are schematic illustrations of an exemplary aircraft with a pair of cross-flow fan systems mounted to the tail section providing thrust in a forward flight mode in accordance with an exemplary embodiment of the present disclosure.
Figure 1B:
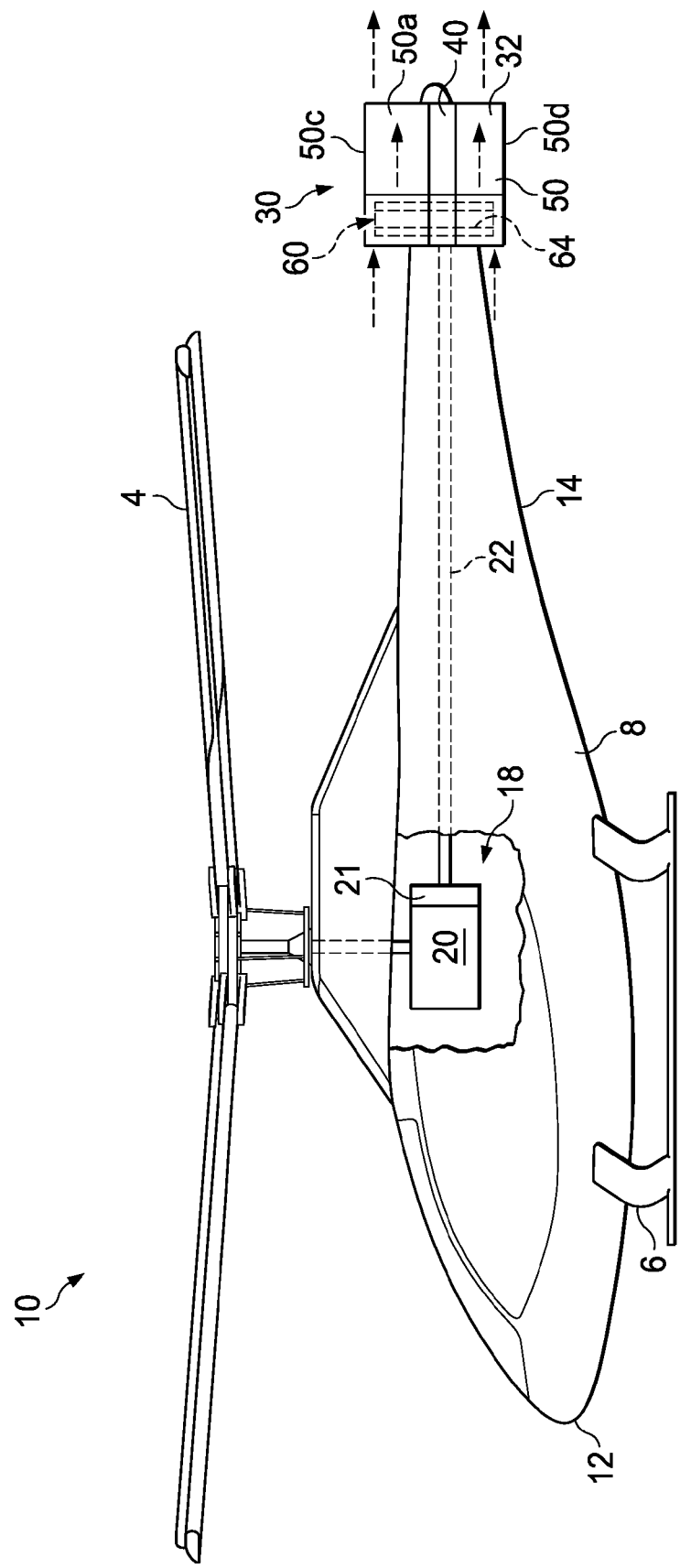
Figure 1C:
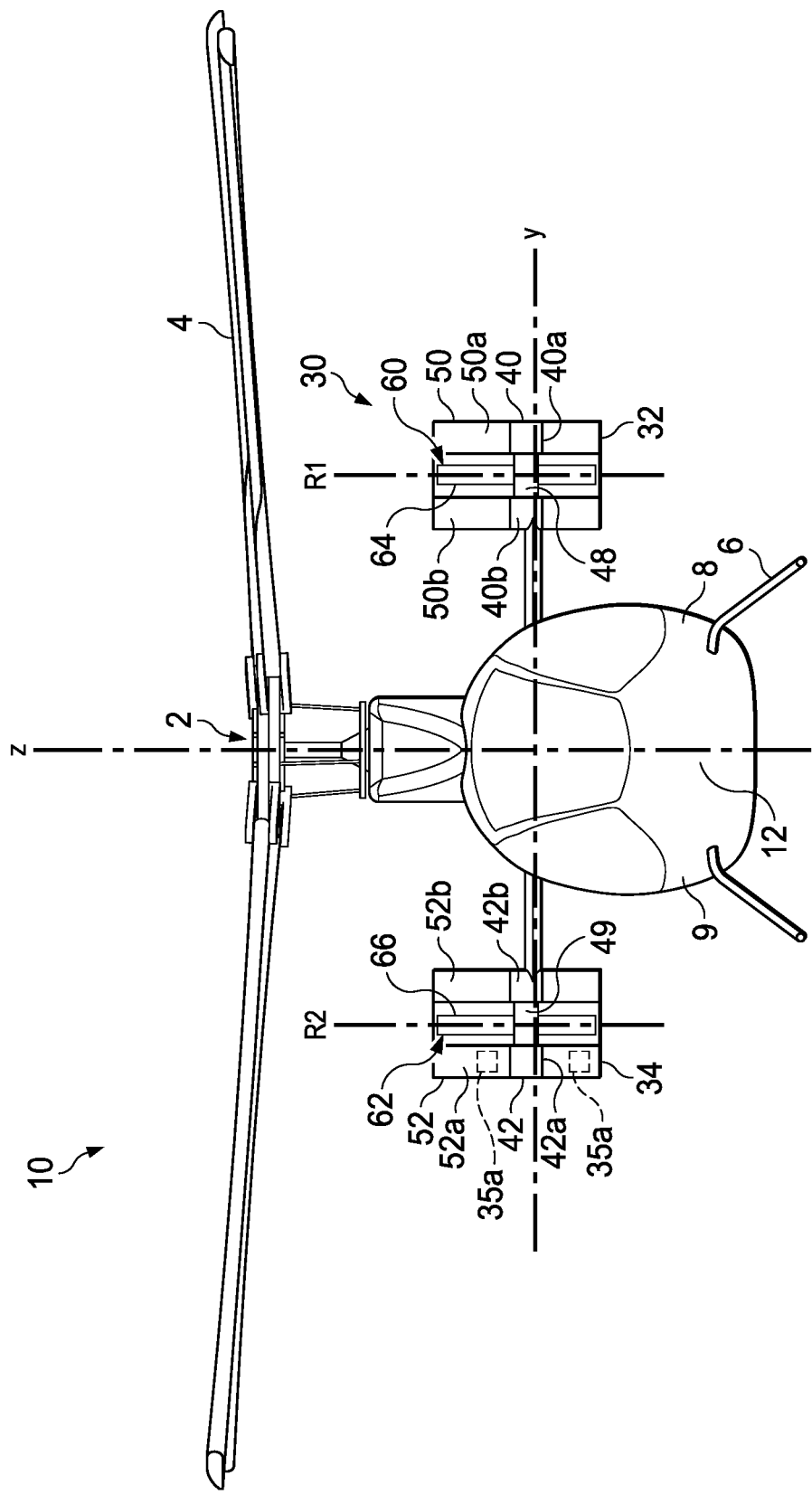
Figure 1D:
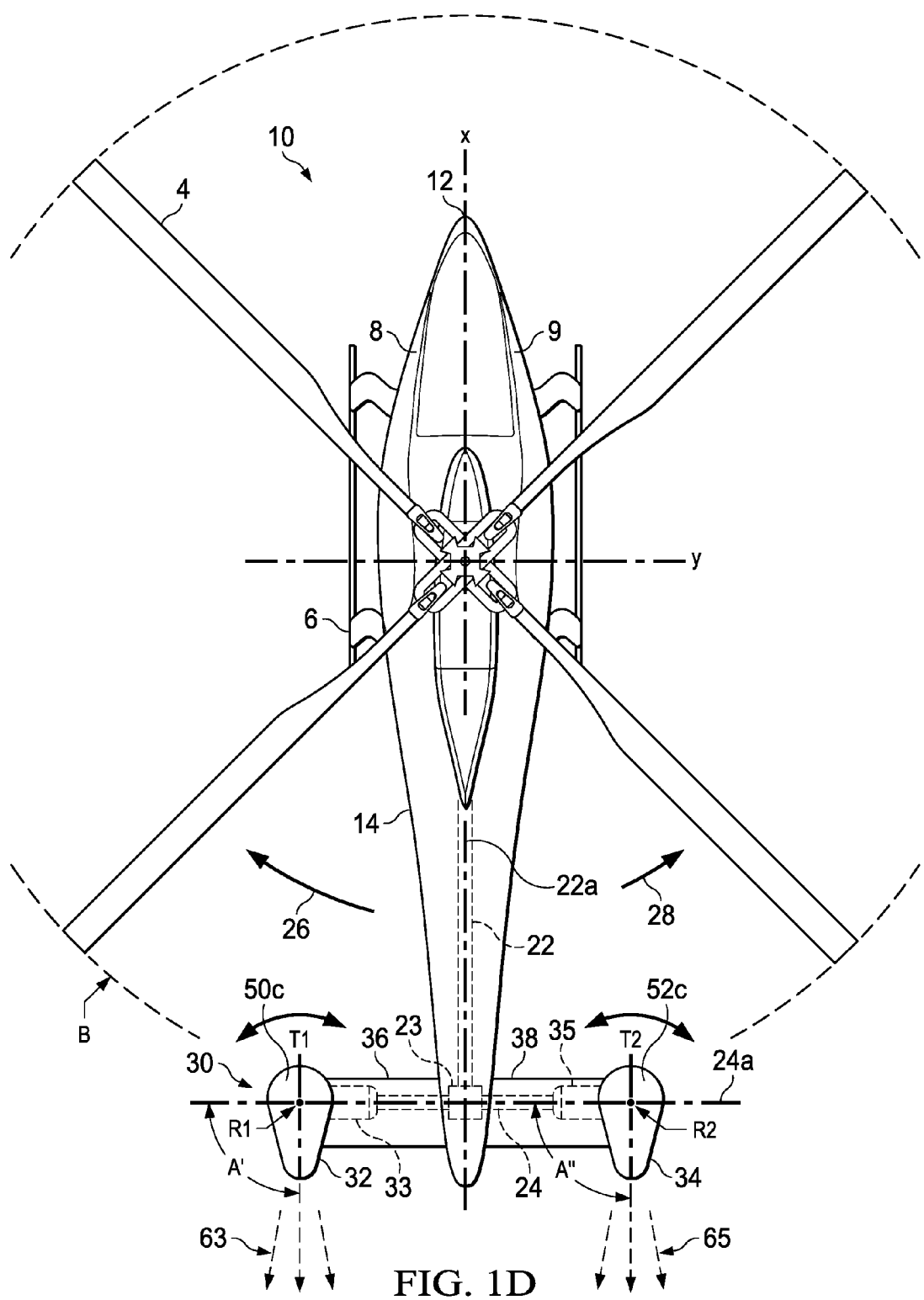
Figure 2A:
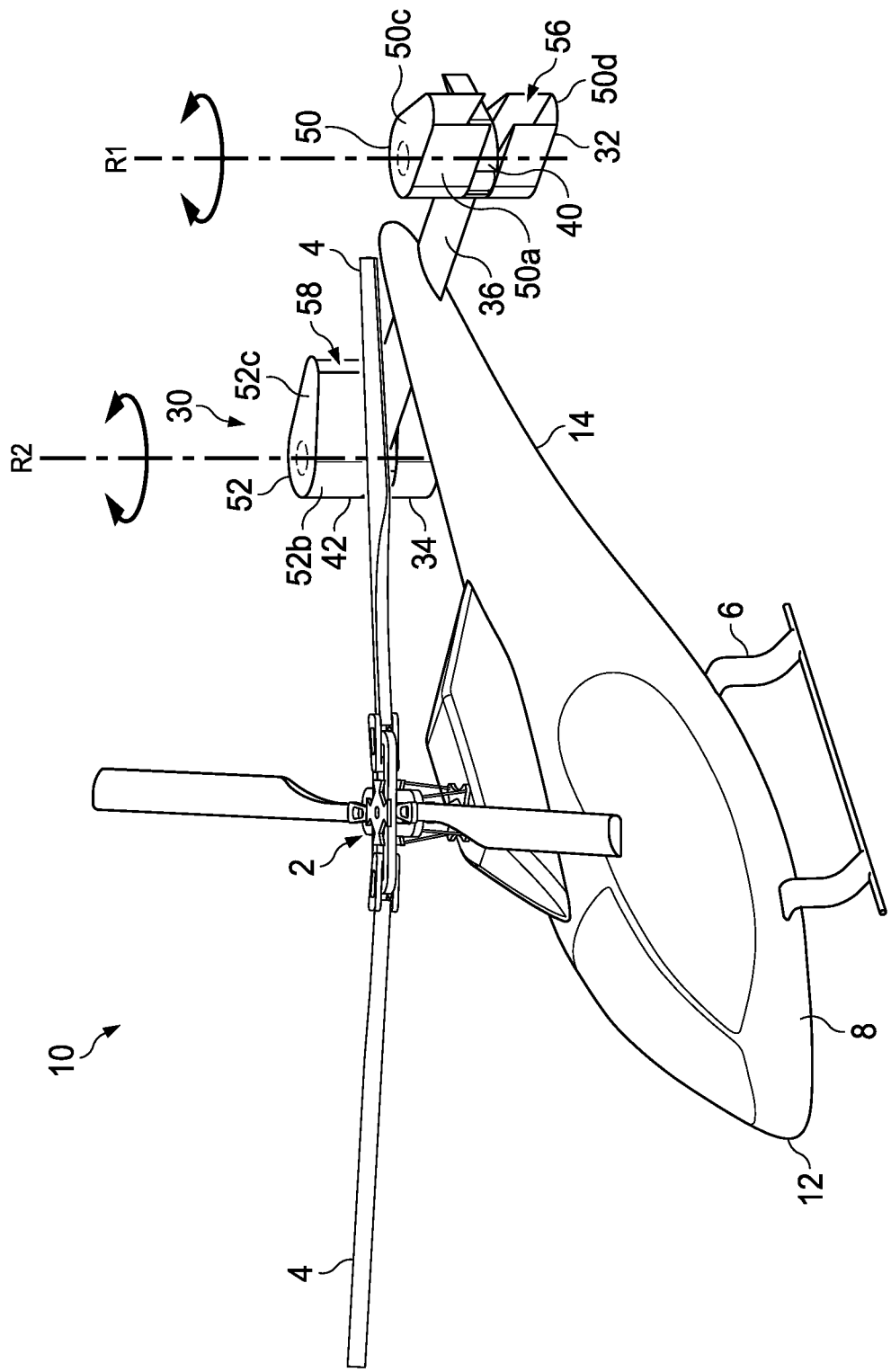
FIGS. 2A-2D are schematic illustrations of an exemplary aircraft with a pair of cross-flow fan systems mounted to the tail section providing an anti-torque force operating in accordance with an exemplary embodiment of the present disclosure.
Figure 2B:
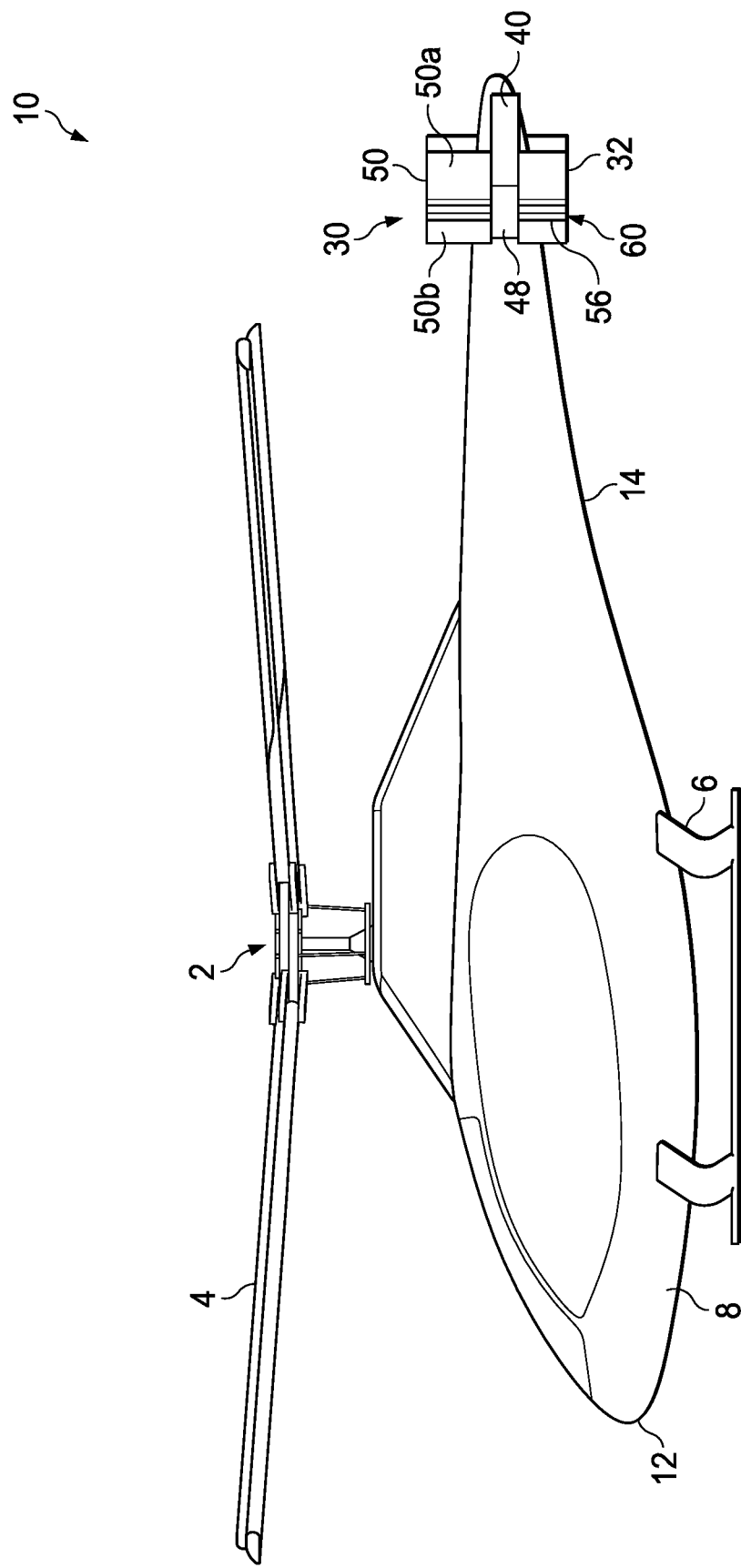
Figure 2C:
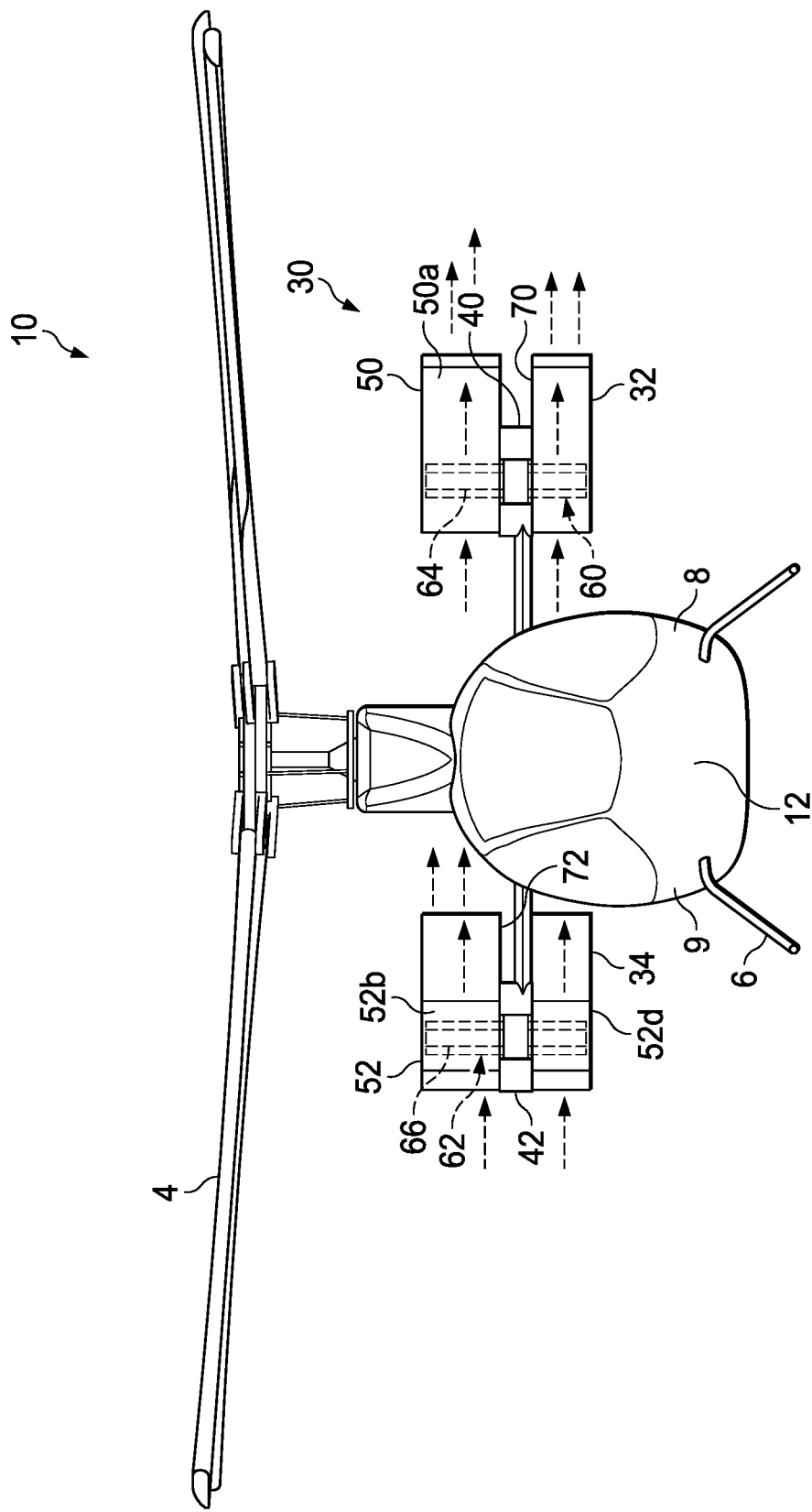
Figure 2D:
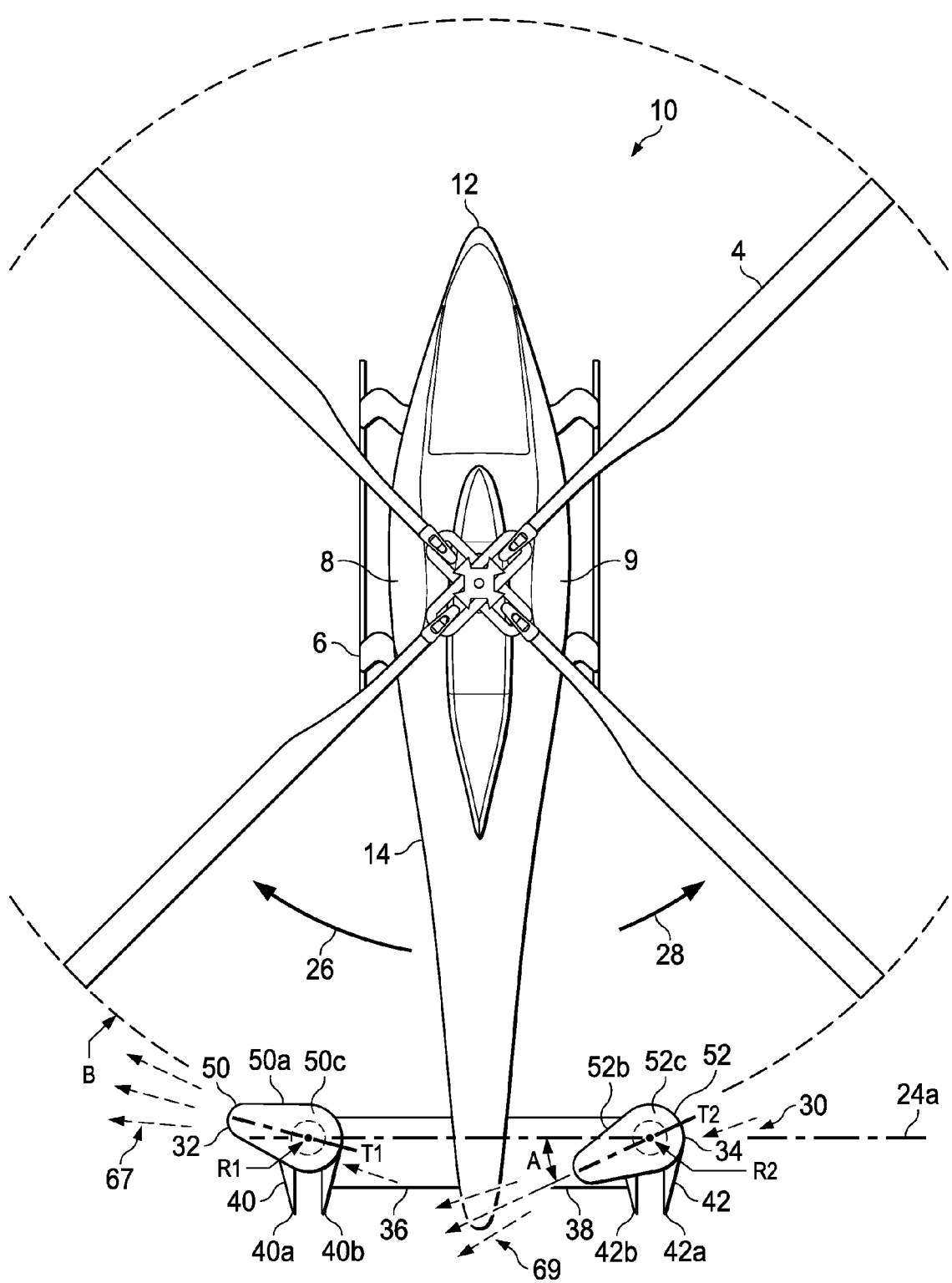
Figure 3:
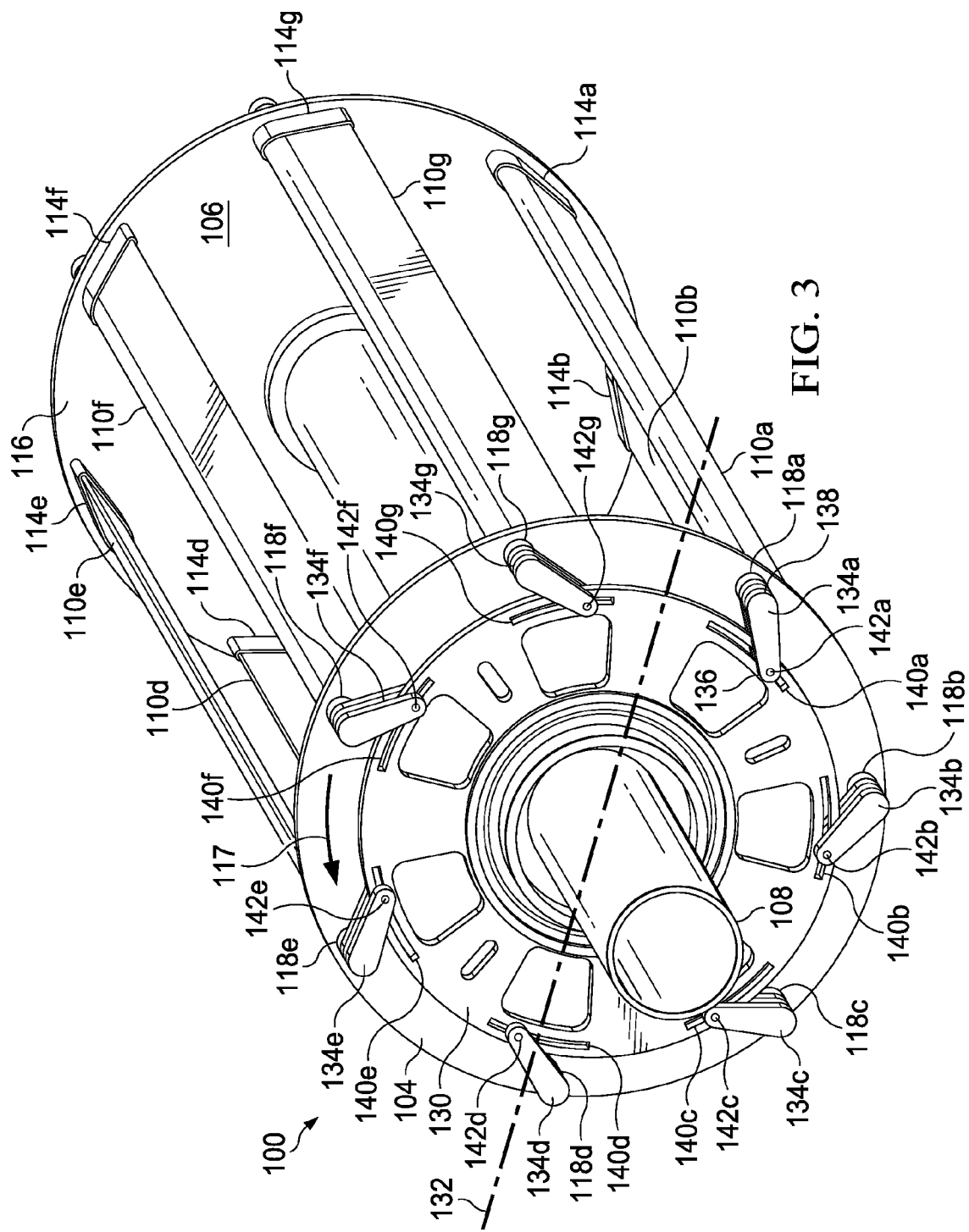
FIG. 3 is an isometric view of a variable thrust cross-flow fan system in accordance with an exemplary embodiment of the present disclosure.

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

At least one cross-flow fan system supported by a tail portion of an aircraft is configured to provide thrust and anti-torque forces during in flight operations. The cross-flow fan system is oriented generally vertically and can include an airfoil shaped shroud. The cross-flow fan system is configured to selectively provide aircraft with a forward thrust vector and an anti-torque vector, as described in further detail herein. When the cross-flow fan system is in an aft position, as shown in FIGS. 1A-1D, air flow passes through the cross-flow fan system to produce a forward thrust vector in a high-speed forward flight mode. The cross-flow fan system can be rotated to produce an anti-torque vector in hover and low speed flight modes. In an embodiment, the pitch of the fan blades in the cross-flow fan system can be adjusted to provide yaw control for the aircraft.

Referring to FIGS. 1A-1D and 2A-2D, an exemplary aircraft 10 is schematically illustrated. Aircraft 10 has a main rotor system 2 with a plurality of main rotor blades 4. The pitch of main rotor blades 4 can be collectively and cyclically manipulated to selectively control direction, thrust and lift of aircraft 10. Aircraft 10 has a landing gear system 6 to provide ground support for aircraft 10. Aircraft 10 includes a left side 8 and a right side 9. Aircraft 10 includes a fuselage 12, and an aft portion 14 with a tailboom extending from the rear of fuselage 12.

It should be appreciated that aircraft 10 is merely illustrative of a variety of aircraft that can implement the embodiments disclosed herein. Other aircraft implementations can include hybrid aircraft, tilt rotor aircraft, unmanned aircraft, gyrocopters and a variety of helicopter configurations, to name a few examples. The illustrative embodiments may also be used on airplanes. It should be appreciated that even though aircraft are particularly well suited to implement the embodiments of the present disclosure, non-aircraft vehicles and devices can also implement the embodiments.

During operation, main rotor 2 rotates in a direction indicated by an arrow 26. Such rotation produces a torque on fuselage 12 in a direction indicated by an arrow 28. When a cross-flow fan system 30 is in an aft position, as shown in FIGS. 1A-1D, air flow passes through the cross-flow fan systems 32, 34 to produce a forward thrust vector for a high-speed forward flight mode. Each of the cross-flow fan systems 32, 34 can be independently rotated, as shown in FIGS. 2A-2D to produce an anti-torque vector in hover and low speed flight modes. The pitch of the fan blades in the cross-flow fan systems 32, 34 can be adjusted to provide yaw control for the aircraft 10.

The figures herein show three mutually orthogonal directions X, Y, and Z forming a three-dimensional frame of reference XYZ. A longitudinal axis X corresponds to the roll axis that extends through the center of the fuselage 12 in the fore and after directions. A horizontal axis Y said to be "transverse" is perpendicular to the longitudinal axis and extends in the left and right directions. The horizontal axis Y corresponds to the pitch axis (also known as a control pitch axis or "CPA") inherent to fuselage 12. The X-Y axes correspond to X-Y planes that are considered to be "horizontal." A vertical axis Z is the yaw axis that extends and is oriented perpendicular with respect to the X-Y axes. The X-Z plane and Y-Z plane are considered to be "vertical."

First and second tail members 36, 38 horizontally extend from aft portion 14 of the aircraft 10 and support a pair of cross-flow fan systems 30 mounted vertically thereon. In an embodiment, the pair of cross-flow fan system 30 is a first and a second variable thrust cross-flow fan systems 32, 34. In other embodiments, only one cross-flow fan system 32 is associated with the aft or tail portion 14 of the aircraft 10. It should be appreciated that the cross-flow systems described herein may take on a wide variety of configurations. For example, there may be one, two, three, four or more cross-flow fan system supported by a tail portion of the aircraft.

In an exemplary embodiment, the first and second variable thrust cross-flow fan systems 32, 34 are mounted on distal ends 40, 42 of horizontal tail members 36, 38. The distal ends 40, 42 include an inboard end 40b, 42b and an outboard end 40a, 42a. In other embodiments, the first and second cross-flow fan systems 32, 34 can be disposed inboard the outboard ends 40a, 42a. In another embodiment, the first and second cross-flow fan systems 32, 34 are mounted to the aft portion 14 of the aircraft. In a contemplated embodiment, at least one cross flow fan 32 is mounted to or within a tail portion that includes a single vertical stabilizer or multiple stabilizers.

In an embodiment, the pair of cross-flow fan systems 30 are connected to a drive system 18. In the illustrated embodiment, drive system 18 includes an engine 20, a transmission 21, and a drive shaft 22. Engine 20 and transmission 21 provide torque and rotational energy to a drive shaft 22 to rotate main rotor 2. In addition, engine 20 and transmission 21 provide torque and rotational energy to drive shaft 22. Drive shaft 22 may be a single long shaft connected to a series of shorter shafts in the horizontal tail members 36, 38. The drive shaft 22 may preferably have flexible couplings to allow flexure. The aft end of the drive shaft 22 mechanically couples to a spiral bevel gear assembly 23, which changes power direction from along a fuselage axis 22a to a tail axis 24a. In one embodiment, the fuselage axis 22a is a centerline axis of the driveshaft 22 and is generally parallel to the longitudinal axis X of the aircraft fuselage 12. In an embodiment, the tail axis 24a is a centerline axis of the tail driveshaft 24 and is generally parallel to the Y axis of the fuselage 12. In another embodiment, the tail axis 24a is a centerline axis of the tail driveshaft 24 and is generally parallel to the Z axis of the fuselage 12. It will be appreciated that the contemplated embodiment is configured showing a traditional engine 20 and transmission 21 with mechanical power transfer to drive shafts 22, 24. In other embodiments, electric, hydraulic, and combustion power systems or combinations thereof can be used as to drive the pair of cross-flow fan systems 30.

It should be noted that since engine 20 preferably operates at a constant rotational speed or velocity during flight operations, the gearing in transmission 21 is used to adjust the engine output to an optimum rotational speed for the pair of cross-flow fan systems 30.

Each of the variable thrust cross-flow fan systems 32, 34 includes a shroud 50, 52 having an exterior aerodynamic profile to protect variable thrust cross-flow fan assemblies 60, 62 therein, respectively. Shroud 50 includes an outer and inner housing 50a, 50b each having an outboard surface and inboard surface. The outer and inner housing 50a, 50b have an upper housing 50c and lower housing 50d. Shroud 52 includes an outer and inner housing 52a, 52b each having an outboard surface and inboard surface. The outer and inner housing 52a, 52b have an upper housing 52c and a lower housing 52d. The exterior of the shrouds 50, 52 can have an aerodynamic profile and protects the cross-flow fan assemblies disposed therein. Moreover, the movable parts of the cross-flow fan systems 32, 34 being disposed within the respective shroud 50, 52 eliminates tail rotor strikes thereby providing a significantly safer environment for the personnel during ground operations.

Each of the shrouds' 50, 52 outer and inner housings 50a, 50b, 52a, 52b are rotatably coupled to the distal ends 40, 42 of the horizontal tail members 36, 38. Each shroud 50, 52 includes a duct 56, 58, which directs the accelerated airflow from the cross-flow fan assemblies 60, 62 to generate at least one of the following: a forward thrust vector and an anti-torque vector. The shrouds 50, 52 are configured to be selectively and independently rotated by actuators 33a, 35a (schematically shown in FIGS. 1A, 1C). Actuators 33a, 35a can be linear or rotary actuators disposed in the outer housings 50a, 52a. In an embodiment, inner housings 50b, 52b are interconnected to the outer housings 50a, 52a such that when the outer housings 50a, 52a are rotated, the inner housings 50b, 52b are also rotated. In other embodiments, actuators 33a, 35a are disposed in each of the outer and inner housings 50a, 50b, 52a, 52b to permit independent rotation thereof. When the shrouds 50, 52 are in the aft position as shown in FIGS. 1A-1D, the shrouds 50, 52 direct the accelerated airflow from the fans 60, 62 to produce a forward thrust vector 63, 65 on the aircraft 10. When the shrouds 50, 52 are rotated from the aft position as shown in FIGS. 2A-2D, the shrouds direct the accelerated airflow from the fans 60, 62 to produce an anti-torque vector 67, 69 on the aircraft 10.

Each of the variable thrust cross-flow fan assemblies 60, 62 are rotatably mounted to distal ends 40, 42 of the horizontal tail members 36, 38 within the interior duct 56, 58, respectively. As discussed herein, first and second variable thrust cross-flow fan assemblies 60, 62 each have a plurality of blades 64, 66, respectively, that are rotated about a rotational axis R1, R2 responsive to the rotation of drive shaft 24. In an exemplary embodiment, the tip of the blades 4 forms an arc B during operation and the rotational axes R1, R2 of the cross-flow fan assemblies 32, 34 can be located thereon. In other embodiments, the rotational axes R1, R2 are disposed aft or forward of the arc B.

In one embodiment, blades 64, 66 of variable thrust cross-flow fan assemblies 60, 62 rotate at a constant speed proportional to that of main rotor 2 based upon the gear ratios of transmission 21. Rotating blades 64, 66 of variable thrust cross-flow fan assemblies 60, 62 at a constant speed is advantageous, as this eliminates any additional systems and the associated complications necessary to enable variable speed rotation. In another embodiment, each of the first and second variable thrust cross-flow fan systems 32, 34 independently rotates about rotational axes R1, R2 and can be controlled by actuators 33, 35. Each of the variable thrust cross-flow fan assemblies 60, 62 can be one cross-flow fan unit. In the exemplary embodiment, each of the cross-flow fan assemblies 60, 62 can include an upper and lower cross-flow fan unit 60a, 60b, 62a, 62b.

Each of the variable thrust cross-flow fan assemblies 60, 62 are oriented generally vertically on the horizontal tail members 36, 38. In an embodiment, the rotational axes R of the first and second variable thrust cross-flow fan assemblies 60, 62 are generally perpendicular to the longitudinal axis of the fuselage 12. In a contemplated embodiment, the rotational axes R of the first and second variable thrust cross-flow fan assemblies 60, 62 intersect a horizontal plane Y, which is transverse of the fuselage longitudinal axis 12.

During operation, air enters into the intake region of duct 56, 58 of the cross-flow fan systems 32, 34 and is accelerated through the variable thrust cross-flow fan assemblies 60, 62. Cross-flow fan accelerated air travels through and is expelled from the exhaust region of the respective duct 56, 58 creating a propulsive force. The position of the shroud 50, 52 controls the direction of the propulsive force therefrom.

As shown in FIGS. 1A-1D, the first variable thrust cross-flow fan system 32 is shown with a thrust line T1 located on the longitudinal axis of the upper cover 50c. The second variable thrust cross-flow fan system 34 is show with a thrust line T2 located on the longitudinal axis of the upper cover 52c. During forward flight, the thrust lines T1, T2 of the cross-flow fan systems 32, 34 are generally parallel to each other and are in an "aft" position. Thrust lines T1, T2 are generally at about a 90 degree angle A', A'' from the tail axis 24a when in the aft position. The accelerated air exits the shroud 50, 52 to produce the forward thrust vectors 63, 65 in the aft position.

Referring now to FIGS. 2A-2D, a pilot of the aircraft may selectively rotate the cross-flow fan systems 32, 34 around the respective rotational axes R1, R2 to provide anti-torque and yaw control for the aircraft. Thrust lines T1, T2 of the first and second variable thrust cross-flow fan systems 32, 34 can be rotated from the aft position to an anti-torque position when in the hover and low speed flight modes. The anti-torque positions of the thrust lines T1, T2 are generally not parallel and can be at a range of angles from less than 90 degrees to about less than −90 degrees relative to the tail axis 24a. In an embodiment, the first variable thrust cross-flow fan system 32 is shown with a thrust line T1 at about 10 degrees relative to the tail axis 24a. In this position, the cross-flow fan assembly 32 can provide an anti-torque thrust vector for aircraft 10. The second variable thrust cross-flow fan system 34 is shown with thrust line T2 at an angle A that is less than 90 degrees from the tail axis 24a to provide an ant-torque thrust vector and yaw control.

Aircraft 10 is configured such that main rotor system 2 rotates in a clockwise direction indicated by arrow 26, which produces torque on fuselage 12 in the direction 28. In such a configuration, the anti-torque vectors 67, 69 produced by the rotating cross-flow fan systems 32, 34 act to cancel the torque 28 induced upon aircraft 10 from the rotation of rotor system. It should be appreciated that other embodiments of aircraft 10 may have a rotor system which rotates in a counter-clockwise (opposite from the clockwise direction 26). In such a configuration, the cross-flow fan systems 32, 34 would be rotated in an opposite direction to direct the anti-torque thrust vector in the direction indicated by arrow 26. The cross-flow fan systems 32, 34 may provide at least one of the following anti-torque, pro-torque, directional, forward thrust, or reverse thrust for other aircraft or non-aircraft vehicles. Accordingly, in these embodiments, the thrust lines T1 or T2 of the cross-flow fan systems 32, 34 can have an infinite number of orientations.

The first and second variable thrust cross-flow fan assemblies 60, 62 can produce variable and reversible accelerated airflow that generates thrust vectors in forward, pro-torque and anti-torque directions by changing the pitch, or angles of attack, of blades 64, 66 responsive to commands from the respective actuator assemblies 48, 49. Actuator assemblies 48, 49 may receive input from a pilot via pedals or other sources to operate and control the cross-flow fan assemblies 60, 62.

The variable thrust cross-flow fan assemblies 60, 62 are substantially symmetric; therefore, for the sake of efficiency the variable thrust cross-flow fan systems 60, 62 will be disclosed only with regard to variable cross-flow fan system 60. However, one of ordinary skill in the art would fully appreciate an understanding of the variable thrust cross-flow fan system 62 based up on the disclosure herein of the variable thrust cross flow fan system 60. In an embodiment, variable thrust cross-flow fan assembly 60 is comprised of a first cross-flow fan assembly unit 60a and a second cross-flow fan assembly unit 60b. Each of the first and second cross-flow fan assembly units are rotatably coupled to the distal end 40 of the tail member 36.

Referring to FIGS. 3, 4A-4C, 5A-5C, 6 and 7A-7E, a variable thrust cross-flow fan assembly unit 60a is shown oriented horizontally and from a bottom view to illustrate the control mechanisms and operation thereof. Cross-flow fan assembly unit 100 includes a forward driver plate 104 and an aft driver plate 106, which are coupled to, and rotatable by, drive shaft 108 mechanically connected to drive shaft 22. Cross-flow fan assembly unit 100 also includes blades 110a-110g. Each blade 110a-110g has a respective forward end 112a-112g and a respective aft end 114a-114g. The forward ends 112a-112g of each of blades 110a-110g are rotatably coupled to an aft side of forward driver plate 104. The aft ends 114a-114g of blades 110a-110g are rotatably coupled to a forward side 116 of aft driver plate 106. Thus, when drive shaft 108 rotates forward and aft driver plates 104, 106, blades 110a-110g may rotate or pivot while rotating around drive shaft 108. In the illustrated embodiment, cross-flow fan assembly unit 100, along with blades 110a-110g, rotate in a direction indicated by an arrow 117. As used herein, the term "coupled" may include direct or indirect coupling by any means, including moving and non-moving mechanical connections.

Figure 6:
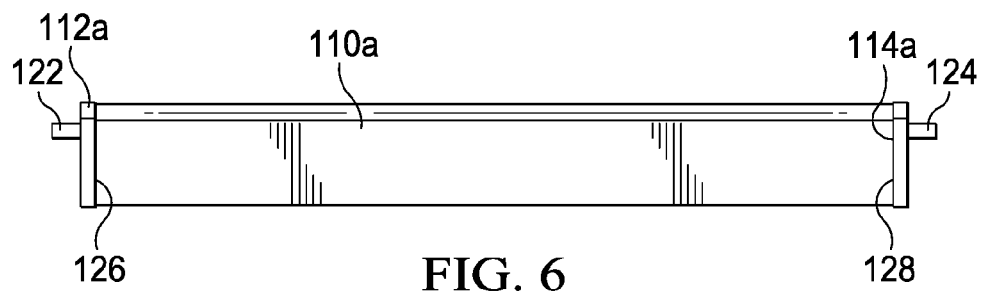
FIG. 6 is a top view of a blade of a variable thrust cross-flow fan system in accordance with exemplary embodiments of the present disclosure.

Forward driver plate 104 forms linkage holes 118a-118g. Driver plate 106 also forms corresponding linkage holes that are not visible in the illustrated embodiments. As best seen in FIG. 6, forward end 112a of blade 110a includes a forward driver pin 122 and aft end 114a of blade 110a include an aft driver pin 124. Blades 110b-110g include similar forward and aft driver pins. Each of the forward driver pins is insertable and rotatable within a respective linkage hole 118a-118g of forward drive plate 104. Likewise, each of the aft driver pins is insertable and rotatable within a respective linkage hole formed by aft driver plate 106. In the illustrated embodiment, driver pins 122, 124 are integral with or coupled to respective end caps 126, 128, as best seen in FIG. 6. In another embodiment, driver pins 122, 124 may be the opposite ends of a shaft (not shown) that extends longitudinally through the body of blade 110a.

Variable thrust cross-flow fan assembly unit 100 includes a control cam 130, which is movable relative to cross-flow fan assembly unit 100, and in particular to forward driver plate 104, along axis 132. In the illustrated embodiment, control cam 130 rotates at substantially the same speed and direction 117 as cross-flow fan assembly unit 100. Control cam 130 is coupled to blades 110a-110g. In particular, control cam 130 is coupled to blades 110a-110g by linkages 134a-134g. With particular reference to linkage 134a in FIG. 5A, linkage 134a has an inner end 136 and an outer end 138. Outer end 138 of linkage 134a is fixedly coupled to forward driver pin 122 of blade 110a, and therefore blade 110a does not rotate relative to linkage 134a. Similarly, each of linkages 134a-134g is fixedly coupled to a respective one of blades 110a-110g, as illustrated.

Figure 4A:
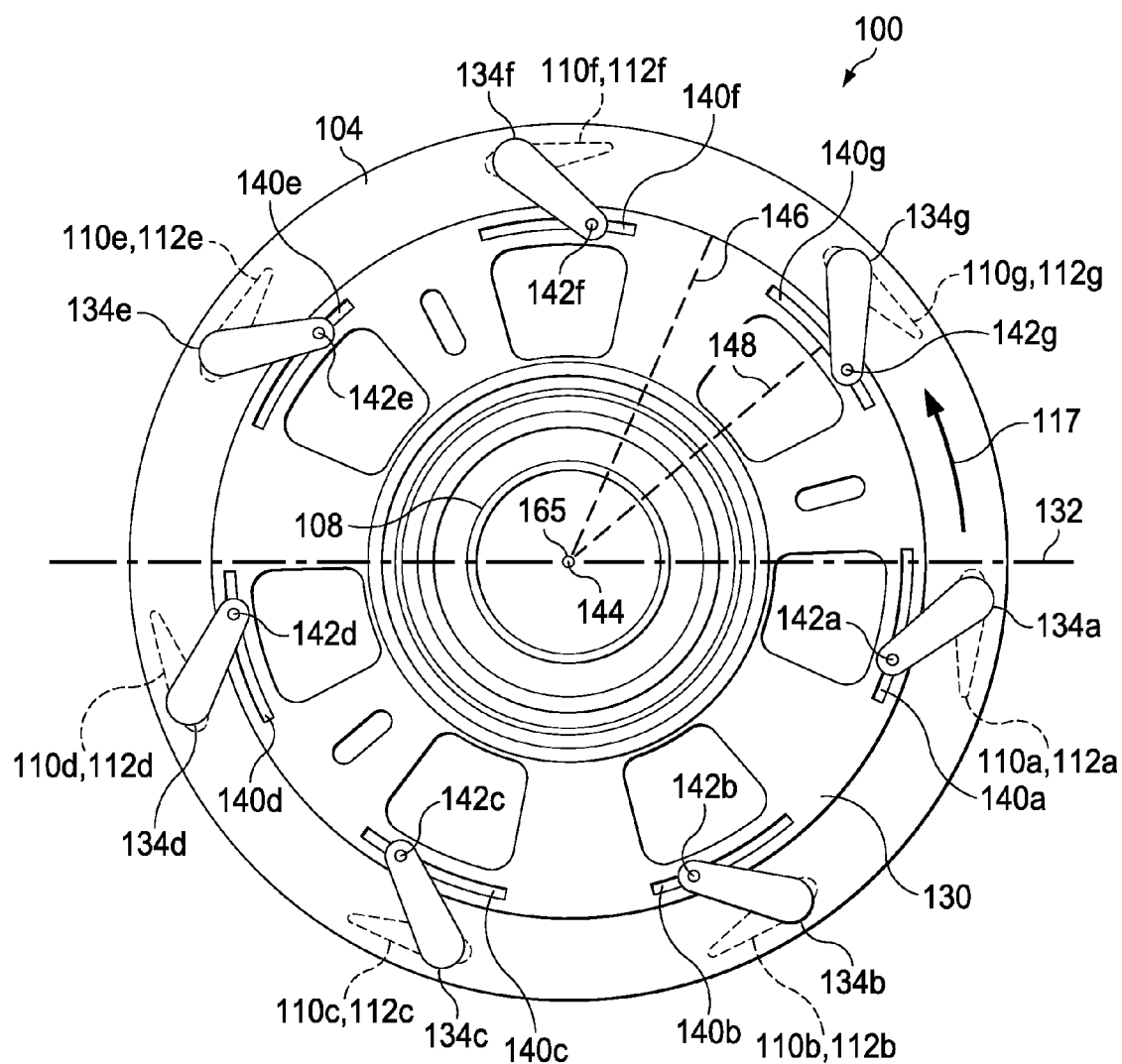
FIGS. 4A-4C are side views of a variable thrust cross-flow fan system in accordance with exemplary embodiments of the present disclosure.

Inner end 136 of linkage 134a is slidably coupled to control cam 130 at follower slot 140a of control cam 130. Similarly, inner ends of linkages 134b-134g are coupled to control cam 130 at follower slots 140b-140g of control cam 130. Follower slots 140a-140g allow the inner ends of linkages 134a-134g to move concentrically relative to control cam 130, while constraining the inner ends of linkages 134a-134g from moving in the radial direction. Referring again to linkage 134a as representative of all linkages 134a-134g, inner end 136 of linkage 134a includes a follower pin 142a that is at least partially inserted, and slidably engaged, with follower slot 140a. Indeed, follower pin 142a may slide along all or a portion of the length of follower slot 140a. In some embodiments, follower pin 142a may extend between two portions of linkage 134a that are on opposite sides of control cam 130. Similarly, follower pins 142a-142g on the inner end of each of linkages 134a-134g are slidably engaged with their respective follower slots 140a-140g in the same or similar manner as that described for linkage 134a. With particular reference to FIG. 4A, control cam 130 is generally circular having a center point 144 and radius 146. Each of follower slots 140a-140g form at least a portion of a circle, or circular arc, and has center point 144 and radius 148. In the illustrated embodiment, radius 146 of control cam 130 is larger than radius 148 of follower slots 140a-140g. Together, control cam 130, linkages 134a-134g and follower pins 142a-142g may be considered a control assembly coupled to blades 110a-110g.

Figure 5A:
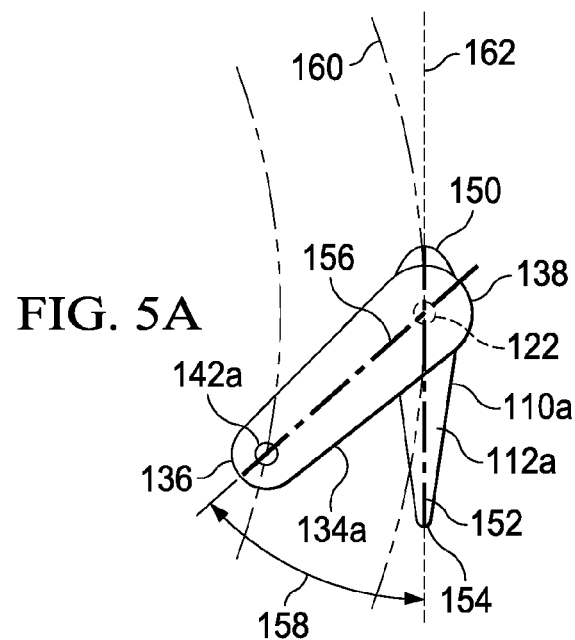
FIGS. 5A-5C are side views of a blade of a variable thrust cross-flow fan system having various pitch angles in accordance with exemplary embodiments of the present disclosure.

With particular reference to FIG. 5A, blade 110a has leading edge 150 and chord line 152. Chord line 152 extends from leading edge 150 to trailing edge 154 of blade 110a. Chord line 152 has a length defined as L. In some embodiments, forward driver pin 122 may be located a distance of approximately L/4, or quarter chord, from leading edge 150. In other embodiments, blade 110a may be rotatable around a point that is L/4 from leading edge 150, whether or not forward driver pin 122 is utilized. In yet other embodiments, forward driver pin 122, or a point of rotation for blade 110a, may be located anywhere along chord line 152. Each of blades 110a-110g may have the same or similar placement of a point of rotation or a forward driver pin as that described with respect to blade 110a in FIG. 5A.

In the illustrated embodiment, blades 110a-110g form an acute angle with the respective linkages 134a-134g to which they are coupled. With particular reference to FIG. 5A, linkage 134a has a centerline 156. Angle 158 formed between chord line 152 of blade 110a and centerline 156 of linkage 134a is an acute angle. In other embodiments, angle 158 may be another type of angle, such as an obtuse angle. Control cam 130 is shown in the illustrated embodiments to be circular, however, a control cam of the present disclosure may be any shape that enables some or all of the control cam functionality described in the illustrative embodiments. For example, control cam 130 may have an irregular shape, while still forming follower slots 140a-140g.

Cross-flow fan assembly unit 100, and therefore blades 110a-110g, may have any length depending on the application. Varying the length of blades 110a-110g may help to accommodate the centrifugal load on each of blades 110a-110g. By way of non-limiting example, blades 110a-110g may be on the order of one or more inches or one or more feet. In addition, while the illustrated embodiments show cross-flow fan assembly unit 100 to have seven blades 110a-110g, cross-flow fan assembly unit 100 may have any number of blades depending on the particular application both less than or greater than seven. The number of linkages, follower slots, follower pins and other parts accompanying each blade may also vary as the number of blades changes. Blades 110a-110g preferably have a shape suitable for providing thrust in accordance with the illustrative embodiments. By way of non-limiting example, blades 110a-110g may have an airfoil shape, arc shape or teardrop shape. Blades 110a-110g may also be either symmetric or non-symmetric along each blade's chord line. Blades 110a-110g may have any thickness or stiffness suitable to withstand the centrifugal load of the particular application and may be formed from any suitable material, including metals such as aluminum and composites such as carbon epoxy. Blades 110a-110g may be hollow or solid and may be formed using any suitable method of manufacture.

To produce thrust, blades 110a-110g may move into one of an infinite number of pitch angle configurations in response to movement of control cam 130 along axis 132. Control cam 130 is movable relative to forward driver plate 104, and in particular, control cam 130 is movable, or translatable, into an infinite number of positions along a plane substantially parallel to forward driver plate 104. By traveling along axis 132, control cam 130 rotates blades 110a-110g via linkages 134a-134g. While each of blades 110a-110g may have a different pitch angle, the positions of all of blades 110a-110g are referred to, in the collective sense, as pitch angle configurations. In some embodiments, the control assembly is operable to change the pitch angle configuration of blades 110a-110g to selectively generate thrust in a plurality of directions including a first direction and a second, opposite direction.

In the illustrated embodiment, blades 110a-110g rotate in a counterclockwise manner, indicated by arrow 117, along a circular path of travel 160. Depending on the pitch angle configuration, each blade 110a-110g may have a positive, negative or zero pitch angle at any particular point around circular path of travel 160 during each revolution. Blade 110a is shown to have substantially zero pitch in FIG. 5A, a positive pitch angle in FIG. 5B and a negative pitch angle in FIG. 5C. Referring particularly to FIG. 5A, circular path of travel 160 is the path along which forward driver pin 122 travels. A tangential projection 162 is also shown for blade 110a. For purposes of reference, tangential projection 162 is tangential to the circular path of travel 160 at a point at which circular path of travel 160 and forward driver pin 122 intersect. Tangential projection 162 may also be a line tangential to the circular path of travel of a point of rotation for blade 110a. In FIG. 5A, blade 110a may be considered to have substantially zero, or extremely low, pitch because the angle between tangential projection 162 and chord line 152 of blade 110a is substantially, or very close to, zero.

Figure 4B:
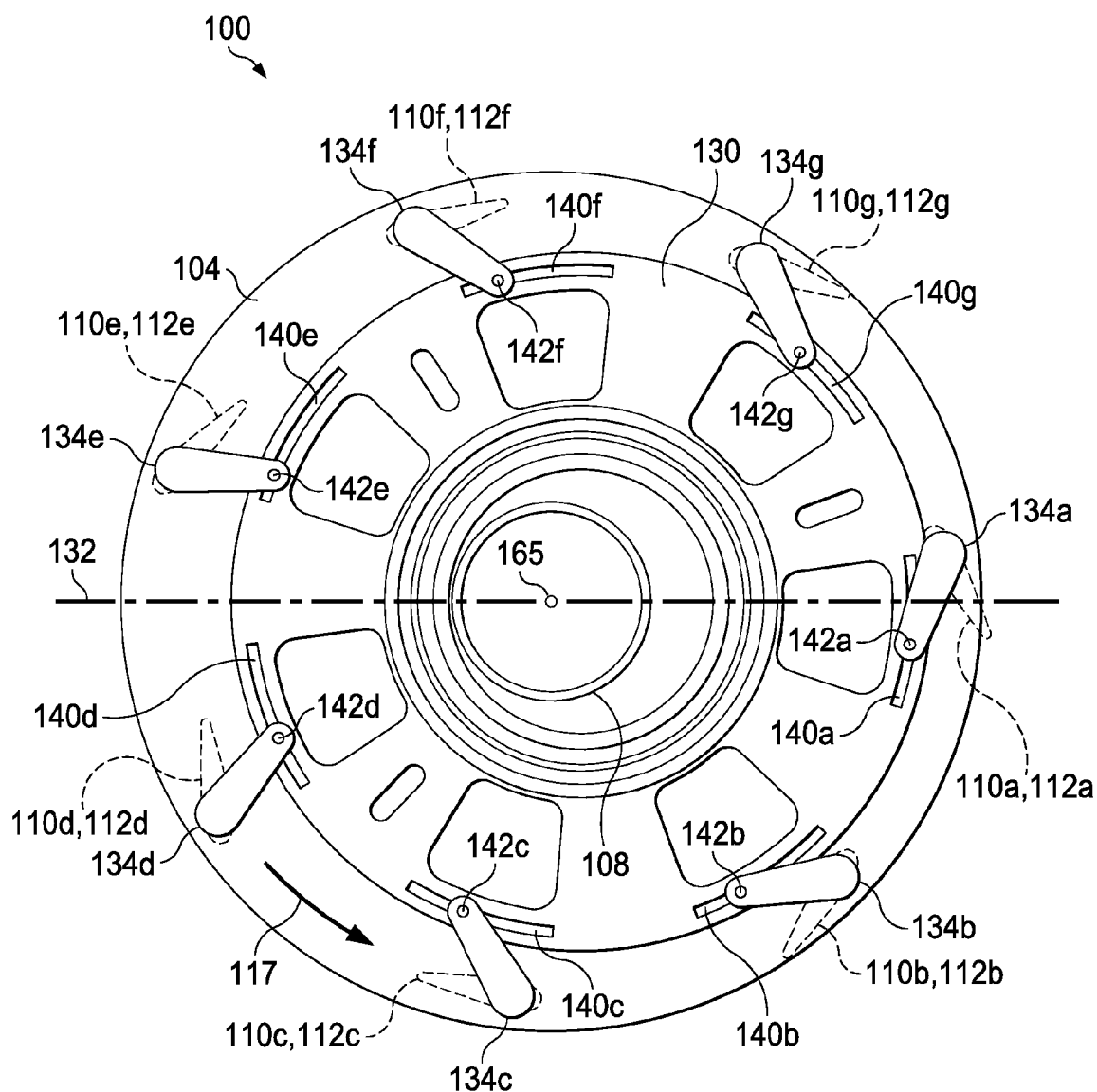
Figure 5B:
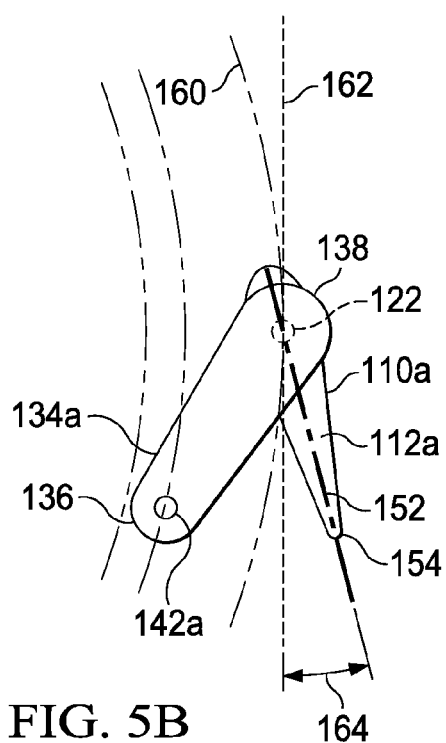
Figure 5C:
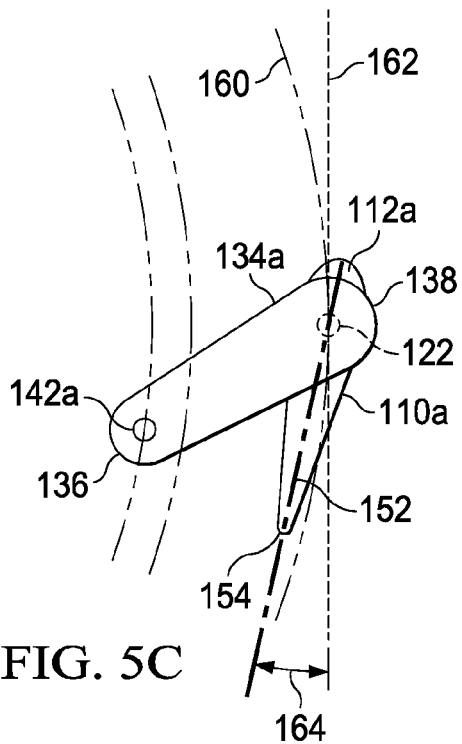

Referring to FIGS. 4B and 5B, blade 110a is shown to have a positive pitch angle. Blade 110a has a positive pitch angle because trailing edge 154 is biased away from center point 165 of circular path of travel 160 and angle 164 formed between chord line 152 and tangential projection 162 is non-zero. Referring to FIG. 5C, blade 110a has a negative pitch angle because trailing edge 154 of blade 110a is biased towards center point 165 of circular path of travel 160 and angle 164 formed between chord line 152 and tangential projection 162 is non-zero.

Figure 4C:
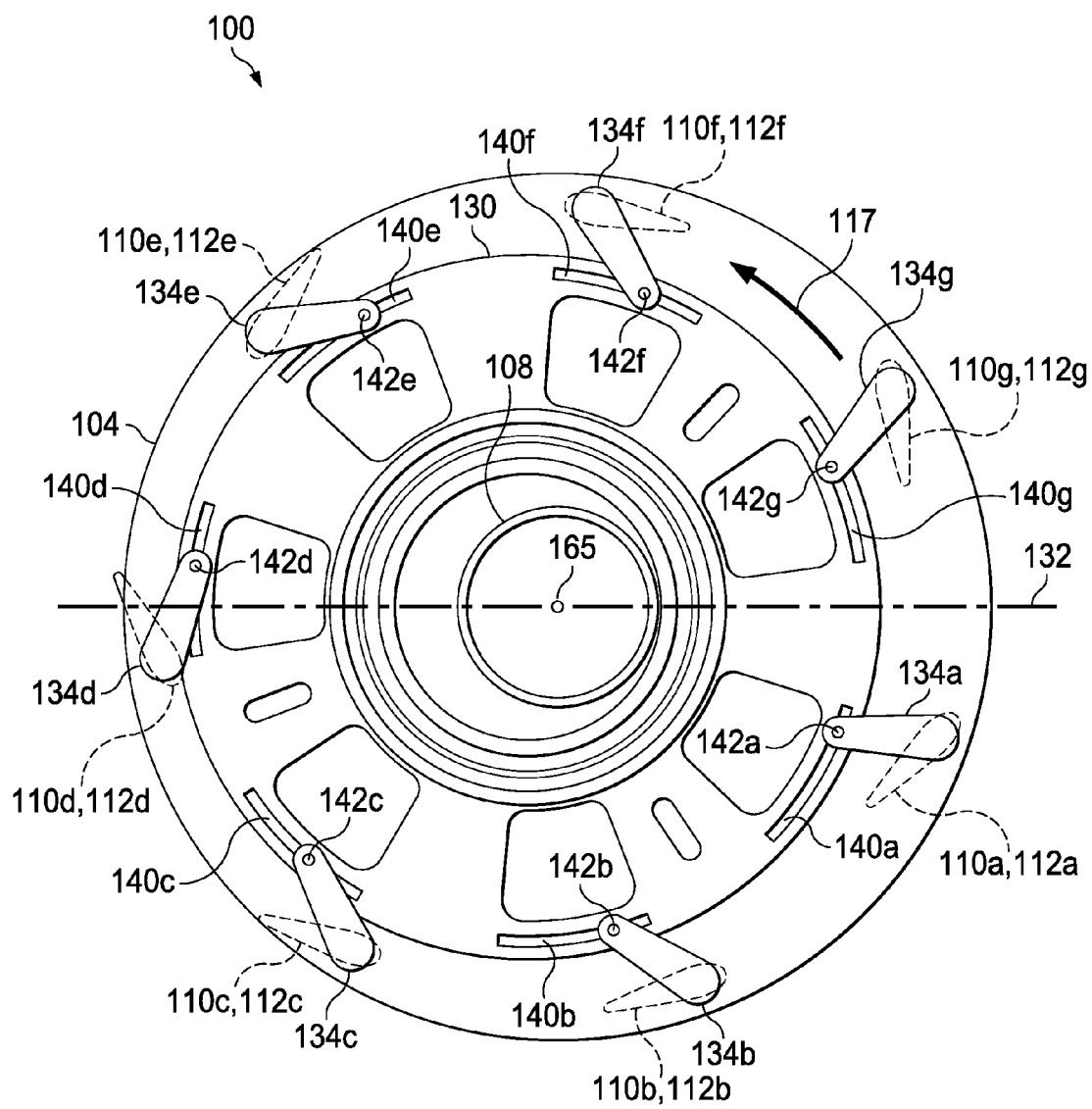

Referring to FIGS. 4A-4C, three positions of control cam 130 are shown. In FIG. 4A, control cam 130 is substantially concentric with drive shaft 108, forward driver plate 104 and circular path of travel 160. In this state, blades 110a-110g are in a neutral configuration and each of blades 110a-110g have a substantially zero pitch during each rotation around circular path of travel 160, as illustrated in FIG. 4A. When blades 110a-110g are in the neutral configuration, all of blades 110a-110g have a zero angle of attack, and therefore produce no thrust in either direction.

Referring to FIG. 4B, blades 110a-110g are in a right thrust configuration as a result of control cam 130 moving to a left position relative to the aircraft. In the right thrust configuration, the pitch angles of each of blades 110a-110g fluctuate between positive and negative pitch angles during each revolution around circular path of travel 160 such that a right thrust is produced thereby. When control cam 130 is in a position that causes blades 110a-110g to be in the right thrust position, blades 110a-110g rotate eccentrically in relation to control cam 130. Control cam 130 is also eccentric to the axis of rotation of both drive shaft 108 and cross-flow fan assembly unit 100 while in the right thrust position. Also, while in the right thrust position of the illustrated embodiment, the leftmost edges of control cam 130 and forward driver plate 104 are closer together than the rightmost edges of control cam 130 and forward driver plate 104. Control cam 130 moves in the opposite direction as the thrust produced when blades 110a-110g rotate along circular path of travel 160.

Blades 110a, 110b, 110g are located on a left portion of circular path of travel 160 and each have varying positive pitch angles depending on their respective locations in the rotation cycle. Blade 110a, which is substantially leftmost in circular path of travel 160, has the largest positive pitch angle of all blades 110a-110g. Each blade 110a-110g progressively moves into or out of this most positive pitch angle of blade 110a as each blade 110a-110g moves into or out of the substantially leftmost position at which blade 110a is shown.

Blades 110c, 110d, 110e, 110f are each on a right portion of circular path of travel 160 for blades 110a-110g. Blades 110c, 110d, 110e, 110f that are on the right portion of the circular path of travel 160 each have varying negative pitch angles. Each blade 110a-110g has its largest negative pitch angle when it reaches the rightmost point of circular path of travel 160. The pitch angles of blades 110a-110g are substantially zero at the topmost and bottommost points of circular path of travel 160, thereby causing substantially zero thrust in the vertical directions. Each of blades 110a-110g have substantially zero pitch angles twice during each revolution along circular path of travel 160, namely, at the topmost and bottommost points of circular path of travel 160. Taken together, the right thrust configuration of blades 110a-110g shown in FIG. 4B produces a rightward thrust for the aircraft as the blades 110a-110g rotate in the direction indicated by arrow 117. It will be appreciated that the right thrust may be either a pro-torque thrust or an anti-torque thrust, depending on the rotational direction of the rotors of the aircraft. Thus, the right thrust configuration shown in FIG. 4B may be either a pro-torque thrust configuration or an anti-torque thrust configuration.

Referring to FIG. 4C, control cam 130 has moved rightward, relative to the aircraft, from the neutral position of FIG. 4A to cause blades 110a-110g to move into a left thrust configuration. In the left thrust configuration, blades 110a-110g rotate, along arrow 117, to produce a left thrust for the aircraft. It will be appreciated that the left thrust may be either a pro-torque thrust or an anti-torque thrust, depending on the rotational direction of the rotors of the aircraft. Thus, the left thrust configuration shown in FIG. 4C may be either a pro-torque thrust configuration or an anti-torque thrust configuration. Similar to the right thrust configuration shown in FIG. 4B, in the left thrust configuration blades 110a-110g change pitch angle during each revolution around circular path of travel 160. In particular, in the left thrust configuration each of blades 110a-110g fluctuates between a positive and negative pitch angle during each revolution around circular path of travel 160.

Control cam 130 has moved in an opposite direction from the leftward thrust produced by blades 110a-110g in the left thrust configuration. Also, the distance between the leftmost point of control cam 130 and the leftmost point of forward driver plate 104 is greater than the distance between the rightmost point of control cam 130 and the rightmost point of forward driver plate 104. The circular path of travel 160 in the left thrust configuration is eccentric to control cam 130. In the left thrust configuration, control cam 130 is also eccentric to the axis of rotation of drive shaft 108 and cross-flow fan assembly unit 100. In the left thrust configuration, blades 110c, 110d, 110e, located on the right portion of circular path of travel 160, each have positive pitch angles that are different from one another. Blades 110a, 110b, 110f, 110g, located on the left portion of circular path of travel 160, each have varying negative pitch angles. Blades 110a-110g, when at the topmost or bottommost point of each revolution, have a substantially zero pitch angle, thereby producing substantially zero vertical thrust in the illustrated embodiment. Each of blades 110a-110g have substantially zero pitch angles twice during each revolution along circular path of travel 160, namely, at the topmost and bottommost points of circular path of travel 160.

In the right and left thrust configurations shown in FIGS. 4B and 4C, each blade 110a-110g may produce a lift, or thrust, force approximately along a radial line between each blade's quarter chord point and center point 165 of circular path of travel 160. The thrust force generated by each blade 110a-110g may be proportional to the angle of attack, or pitch, of the individual blade. In the manner described, a pilot of the aircraft may vary the thrust of variable thrust cross-flow fan assembly unit 100 by changing the lateral position of control cam 130. The right and left thrusts described herein, opposite in direction, are produced by a single cross-flow fan assembly unit 100 that rotates at a substantially constant speed that is substantially equal to the rotational speed of drive shaft 108. Indeed, control cam 130 may be in an infinite number of positions along the axis 132 to produce an infinite number of potential thrust intensities in either the right or left direction. By producing a reversible thrust in this manner, a pilot of the aircraft, by controlling the position of control cam 130, may manage the yaw and torque forces experienced by the aircraft during flight.

Referring next to FIGS. 7A-7E and 8, a variable thrust cross-flow fan assembly unit is schematically illustrated and generally designated 200. Variable thrust cross-flow fan assembly unit 200 includes a plurality of blades 210a-210h that are shown in a variety of pitch angle configurations, which change in response to an input received from a pilot of the aircraft. FIGS. 7A-7E show a housing 274 having an upper potion 274a and lower portion 274b. The illustrated cross sections are from a top view of the variable cross-flow fan system 30 such that housing 274 has a left portion 270 and a right portion 272. In the illustrated embodiment, it is noted that blades 210a-210h form obtuse angles with the respective linkages to which they are attached. As discussed above, blades 210a-210h may form either obtuse or acute angles with their respective linkages. Also, in the illustrated embodiment, blades 210a-210h rotate in a counterclockwise direction at a substantially constant speed during aircraft flight.

Figure 7A:
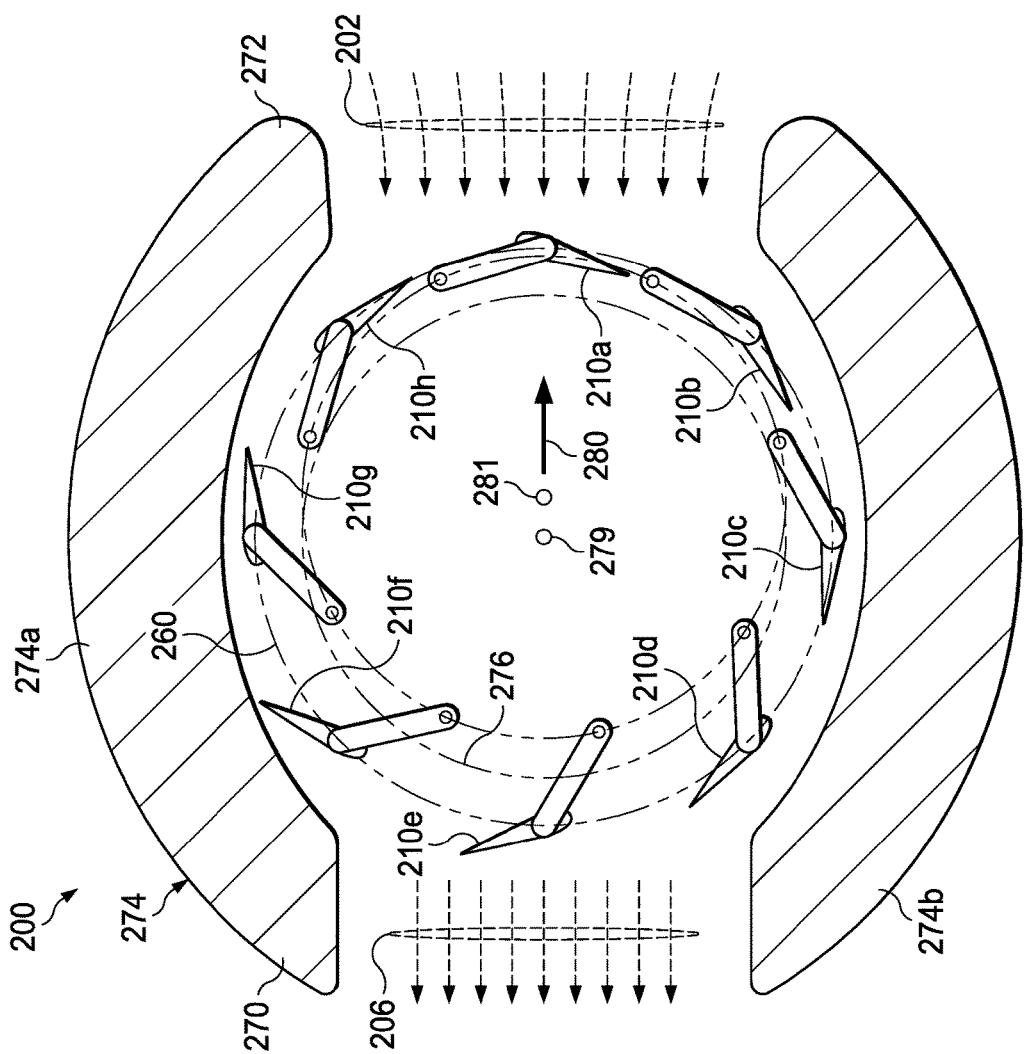
Figure 7B:
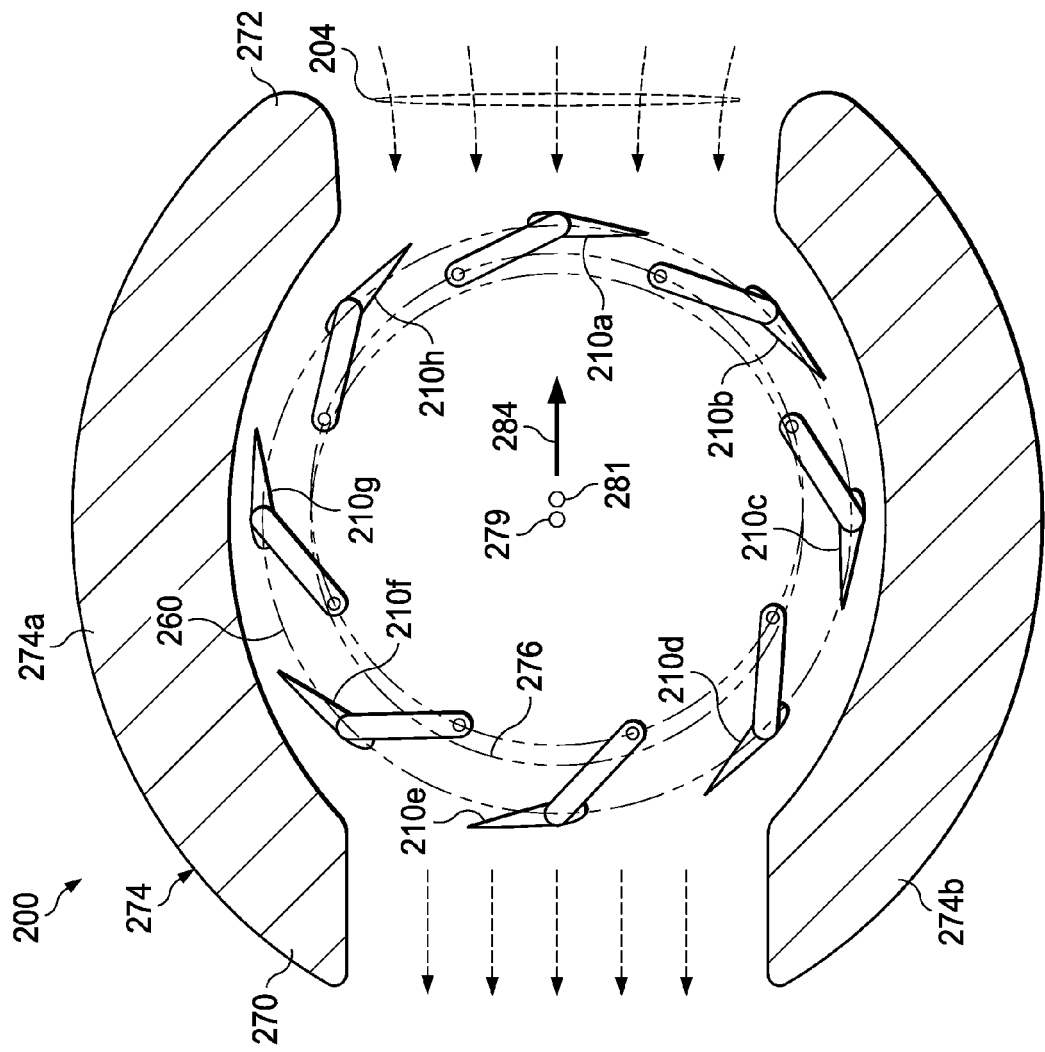
Figure 7C:
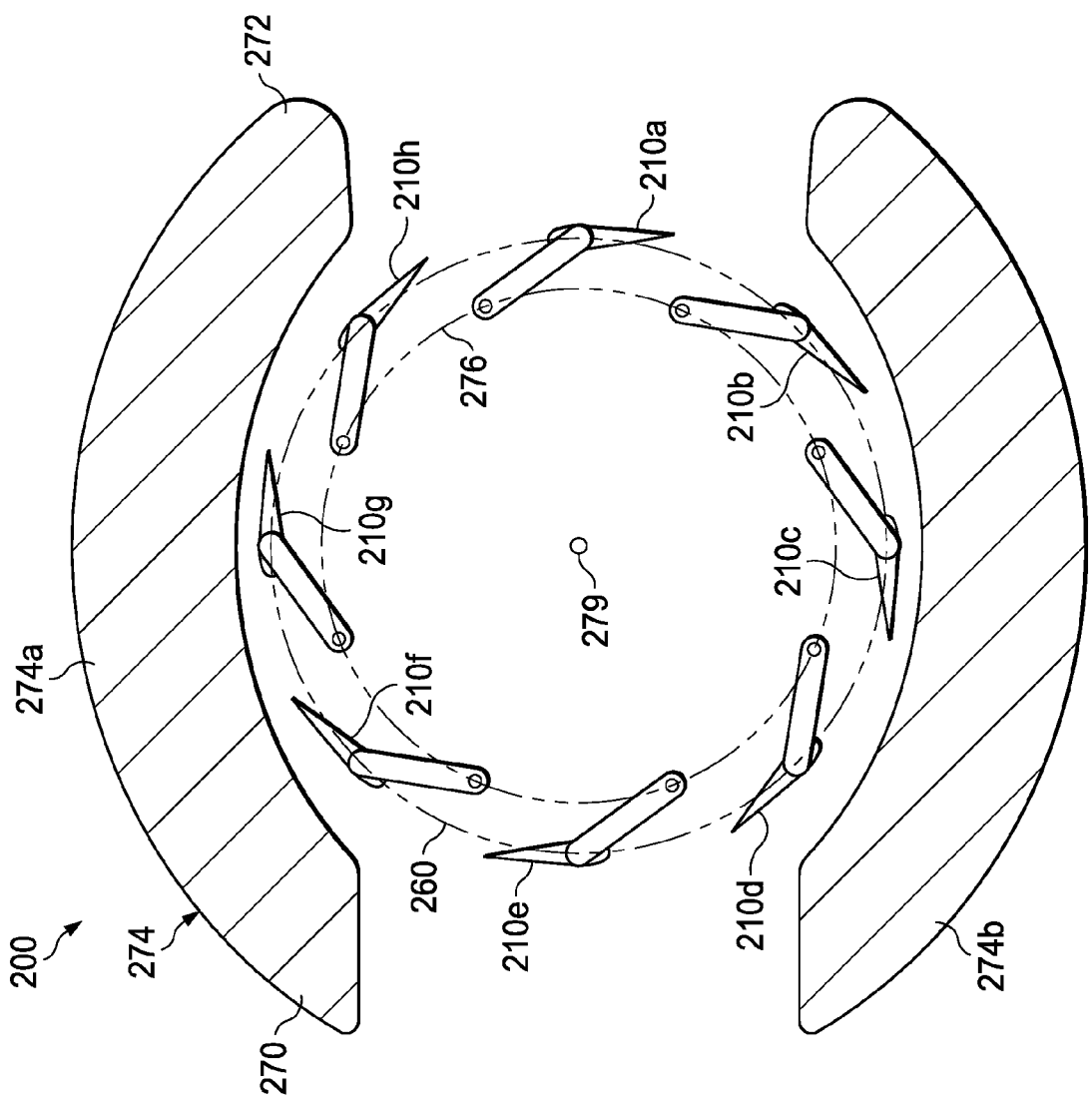

Referring specifically to FIG. 7C, blades 210a-210h are in a neutral pitch angle configuration as the control cam (not shown) is substantially concentric with circular path of travel 260 of blades 210a-210h. Input may be received from a pilot of the aircraft that causes the control cam to be shifted from the neutral position. For example, the input may be one or more anti-torque pedals in the cockpit of the aircraft. The anti-torque pedals may allow for varying degrees of input intensity, expressed as a continuum on the x-axis of FIG. 8.

In particular, the anti-torque pedals may allow for input ranging from −100% to 100%, and all points therebetween. Other examples of input controls by which the control cam may be moved to produce a reversible thrust include a control stick, buttons, knobs, sliders, voice controls, touch-screen controls or electronic input, to name a few. Each of these input controls may allow for the continuum of input positions expressed on the x-axis of FIG. 8. In this manner, the reversible thrust produced by variable thrust cross-flow fan assembly unit 200 may have a direction and intensity that is determined by the input position originating from the cockpit of the aircraft or elsewhere.

In the present example, in which blades 210a-210h have a neutral pitch angle configuration, substantially zero thrust is produced. A neutral position center point 279, which is the center point of the control cam when the control cam is in the neutral configuration, is shown. Further, the input position originating from an input control of the aircraft may be at 0%, as indicated by point 278 in FIG. 8. Moving to FIG. 7A, a maximum ight thrust 280 is produced by blades 210a-210h in the depicted pitch angle configuration. In this right thrust configuration, maximum right thrust 280 is at 100% of variable thrust cross-flow fan assembly's thrust range (−100% to 100%), as indicated by point 282 in FIG. 8. Maximum right thrust 280 corresponds with an input position of 100% from one of the exemplary input controls described above.

In the maximum right thrust configuration of FIG. 7A, the control cam has moved rightward of neutral position 276 of the control cam to a maximum allowable extent. The distance that the control cam has moved is schematically illustrated by showing neutral position center point 279 relative to center point 281 of the control cam. It is also noted that the control cam has moved in the same direction as the thrust produced by blades 210a-210h. This is in contrast to the illustrative embodiments shown in FIGS. 3, 4A-4C, 5A-5C and 6, in which the control cam moved in an opposite direction as the thrust produced by the blades of the variable thrust cross-flow fan assembly unit 100. Among other factors, the direction that the control cam moves relative to the thrust direction may be caused by whether the angle between each blade and its respective linkage is acute or obtuse. Low density air 202 flows through blades 210a-210h as indicated by high-density airflow arrows 206. It is noted that air flows through blades 210a-210h in an opposite direction as the thrust produced by blades 210a-210h.

Figure 8:
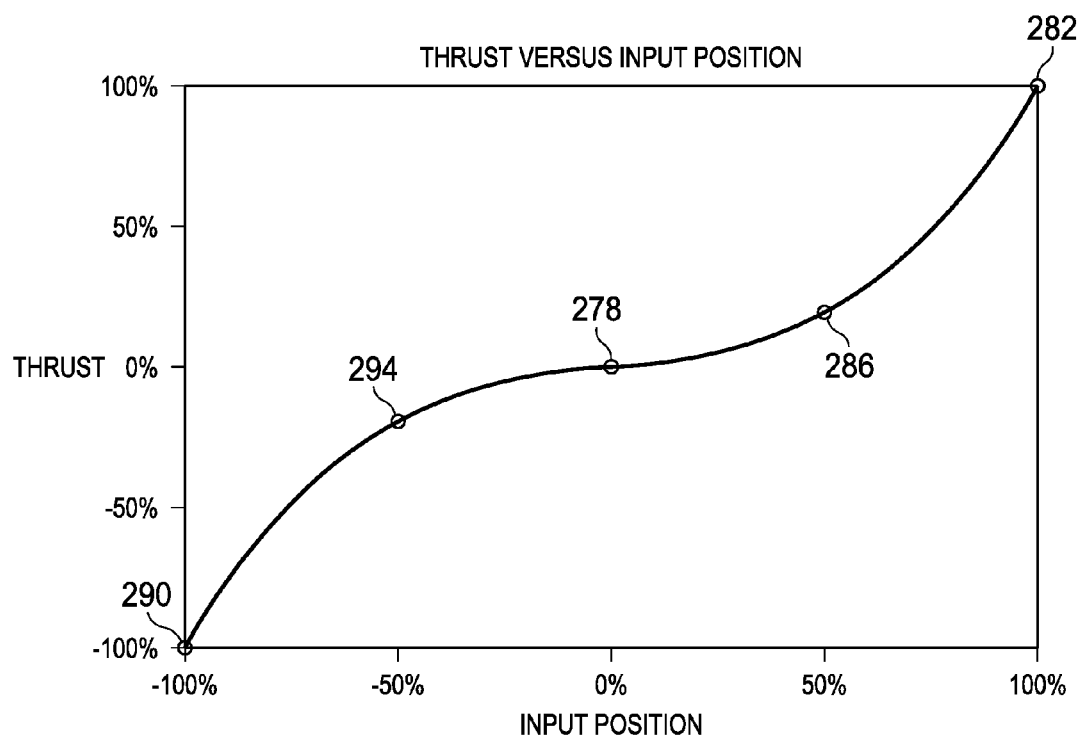
FIG. 8 is a chart illustrating position versus thrust for a variable thrust cross-flow fan system in accordance with exemplary embodiments of the present disclosure.

Moving to FIG. 7B, blades 210a-210h remain in a right thrust pitch angle configuration. However, the control cam is closer to neutral position 276 than it was in FIG. 7A, thereby causing an intermediate right thrust 284, which is less than maximum right thrust 280 in FIG. 7A. The reduced thrust is generated as the maximum pitch angles of blades 210a-210h is reduced and the air flow through variable thrust cross-flow fan assembly unit 200 is reduced as indicated by the reduced density airflow arrows 204. The distance that the control cam has moved is schematically illustrated by showing neutral position center point 279 relative to center point 281 of the control cam. With reference to FIG. 8, intermediate right thrust 284 is approximately 20% of maximum right thrust 280, as indicated by point 286. In the illustrated embodiment, an input position of 50% produces the intermediate right thrust 284 of approximately 20% of maximum right thrust 280.

In the right thrust configurations shown in FIGS. 7A and 7B, as each blade 210a-210h follows circular path of travel 260, blades 210a-210h transition between positive pitch, zero pitch, negative pitch, zero pitch and back to positive pitch during each revolution of the cross-flow fan assembly. As blades 210a-210h approach the leftmost point of circular path of travel 260, the blades have progressively greater positive pitch reaching a maximum positive pitch at the leftmost point of circular path of travel 260. Thereafter, as blades 210a-210h retreat from the leftmost point of circular path of travel 260, the blades have progressively lesser positive pitch reaching zero pitch proximate bottommost point of circular path of travel 260. As blades 210a-210h approach the rightmost point of circular path of travel 260, the blades have progressively greater negative pitch reaching a maximum negative pitch at the rightmost point of circular path of travel 260. Thereafter, as blades 210a-210h retreat from the rightmost point of circular path of travel 260, the blades have progressively lesser negative pitch, reaching zero pitch proximate topmost point of circular path of travel 260. Each blade 210a-210h repeats this cycle on each revolution of the cross-flow fan assembly.

With reference to FIG. 7E, a maximum left thrust 288 is produced by blades 210a-210h in the depicted pitch angle configuration which corresponds to point 290 in FIG. 8 and the −100% location on the continuum of −100% to 100%. When blades 210a-210h produce maximum left thrust 288, the control cam has been moved a maximum allowable distance to the left of neutral position 276. The distance that the control cam has moved is schematically illustrated by showing neutral position center point 279 relative to center point 281 of the control cam. In the illustrated embodiment, a leftward move of the control cam corresponds to a leftward thrust. The left thrust that is produced by blades 210a-210h is the opposite of the airflow direction through blades 210a-210h, as indicated by high-density airflow arrows 206. As shown in FIG. 8, maximum left thrust 288 corresponds with an input position of −100% from one of the exemplary input controls described above.

Figure 7D:
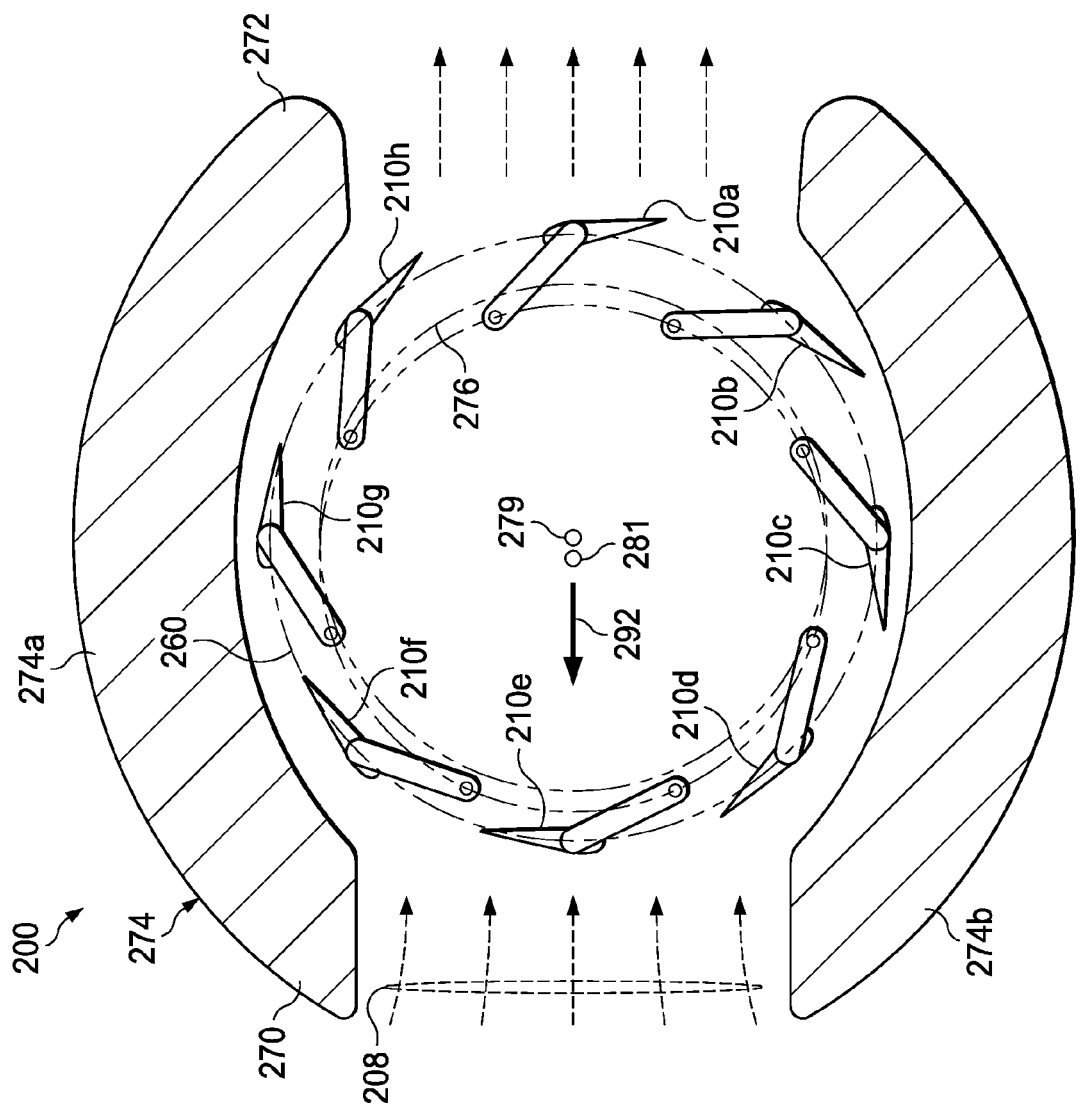

Finally, with reference to FIG. 7D, blades 210a-210h produce an intermediate left thrust 292 in the depicted pitch angle configuration. Intermediate left thrust 292 is less than maximum left thrust 288. In particular, intermediate left thrust 292 is approximately 20% of maximum left thrust 288, as indicated by point 294 in FIG. 8. The control cam is closer to neutral position 276 than in the maximum left thrust configuration of FIG. 7E. The distance that the control cam has moved is schematically illustrated by showing neutral position center point 279 relative to center point 281 of the control cam. To achieve intermediate left thrust 292, the input position has been set at −50% from one of the exemplary input controls described above, as shown in FIG. 8. The reduced thrust is generated as the maximum pitch angles of blades 210a-210h is reduced and the air flow through variable thrust cross-flow fan assembly unit 200 is reduced as indicated by the reduced density airflow arrows 208.

In the left thrust configurations shown in FIGS. 7D and 7E, as each blade 210a-210h follows circular path of travel 260, blades 210a-210h transition between positive pitch, zero pitch, negative pitch, zero pitch and back to positive pitch during each revolution of the cross-flow fan assembly. As blades 210a-210h approach the rightmost point of circular path of travel 260, the blades have progressively greater positive pitch reaching a maximum positive pitch at the rightmost point of circular path of travel 260. Thereafter, as blades 210a-210h retreat from the rightmost point of circular path of travel 260, the blades have progressively lesser positive pitch reaching zero pitch proximate topmost point of circular path of travel 260. As blades 210a-210h approach the leftmost point of circular path of travel 260, the blades have progressively greater negative pitch reaching a maximum negative pitch at the leftmost point of circular path of travel 260. Thereafter, as blades 210a-210h retreat from the leftmost point of circular path of travel 260, the blades have progressively lesser negative pitch, reaching zero pitch proximate bottommost point of circular path of travel 260. Each blade 210a-210h repeats this cycle on each revolution of the cross-flow fan assembly.

FIGS. 7A-7E illustrate that the variability of the thrust based upon the pitch angle configuration of blades 210a-210h which varies responsive to control cam movement. As illustrated and described, the thrust generated by variable thrust cross-flow fan assembly unit 200 is variable in both intensity and direction, either a leftward or rightward direction, and is therefore reversible. Even though five pitch angle configurations of blades 210a-210h have been shown in FIGS. 7A-7E, it should be understood by those skilled in the art that blades 210a-210h may have an infinite number of pitch angle configurations producing an infinite number of thrust intensities, by moving the control cam along an infinite number of possible points along an axis lateral to the direction of travel of the aircraft. Indeed, with reference to FIG. 8, the thrust intensity and direction may vary according to the illustrated curve, including any point thereon. In this manner, a pilot may vary the input position of an input control to vary the thrust intensity and direction produced by variable thrust cross-flow fan assembly unit 200 to manage the yaw and anti-torque of the aircraft. Even though a particular input versus torque curve has been depicted and described, it should be understood by those skilled in the art that the input versus torque curve for a particular implementation will vary based upon factors including the size, shape and materials used to form the blades, the number of blades, the rotational speed of the cross-flow fan system and other parameters.

Figure 9:
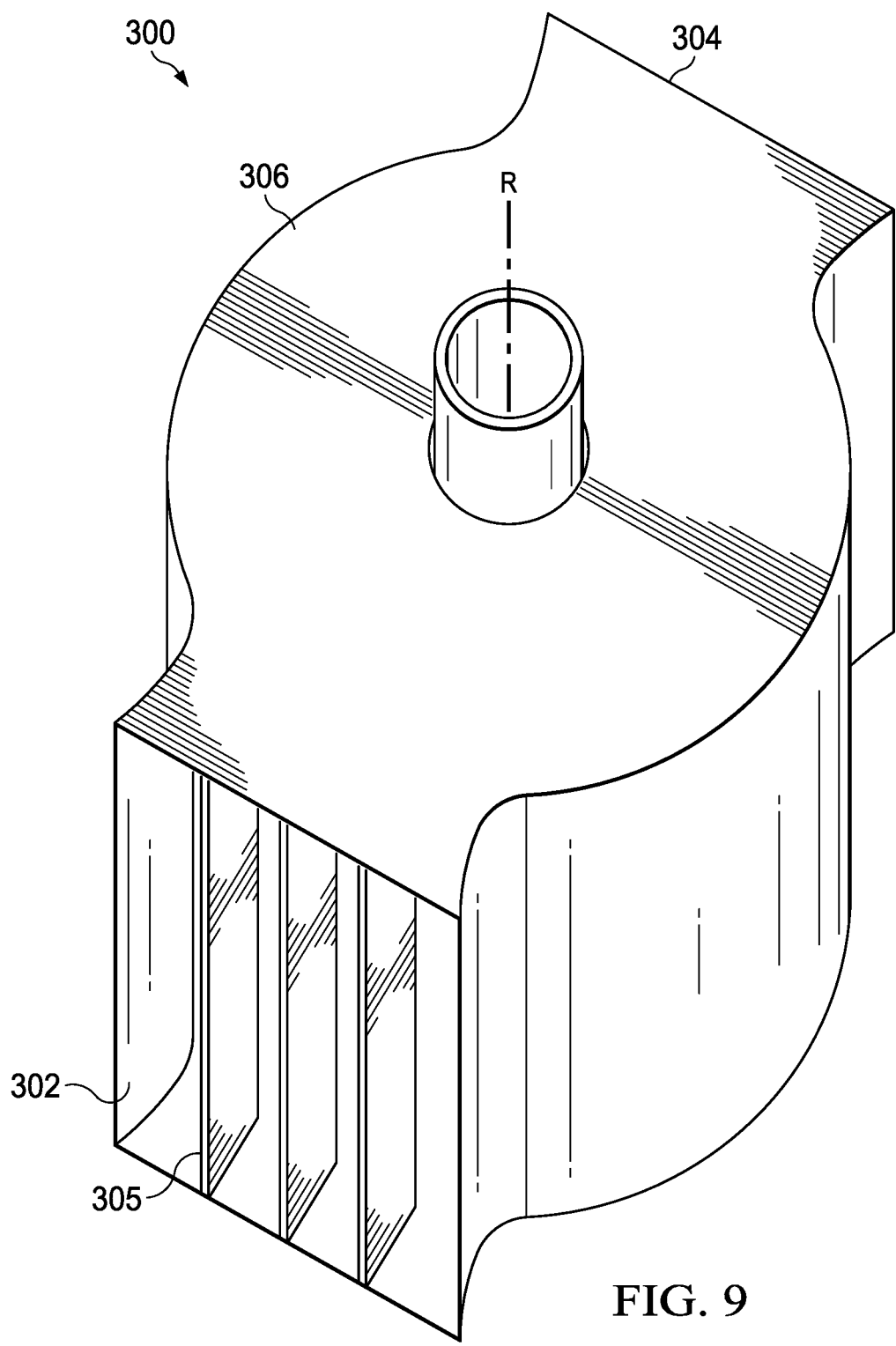
FIG. 9. is an isometric view of an interior duct for a variable thrust cross-flow fan system in accordance with exemplary embodiments of the present disclosure.

Referring to FIG. 9, a duct for a cross-flow system is schematically illustrated and generally designated 300. Duct 300 provides an enclosure for the moving parts of a cross-flow fan assembly and forces air flow to follow a predetermined path. Duct 300 may be mounted in or be formed integrally with the shroud 50, 52 of an aircraft 10. Duct 300 along with shroud 50, 52 can protect the fan blades from objects and prevent injury by creating a barrier between people and the blades.

In the illustrated embodiment, duct 300 includes an intake region 302, an exhaust region 304, and a fan region 306 disposed between the intake region 302 and exhaust region 304. Intake and exhaust regions 302, 304 allow air to pass through the duct 300 so that thrust may be generated in the fan region 306 by a cross-flow fan assembly 60, 62 in accordance with the illustrative embodiments described above.

In one embodiment, each intake and exhaust regions 302, 304 of duct 300 can include a plurality of vertical slats 305 to provide for directional control of the airflow and thrust of variable thrust cross-flow fan system. Slats 305 may be adjustable or movable based on input from a pilot to enable thrust vectoring operations. For example, slats 305 may be tilted such that a thrust generated by the cross-flow fan assembly has a left or right component, thereby providing yaw control of the aircraft.

In another embodiment, each intake and exhaust regions 302, 304 of duct 300 can include adjustable or movable horizontal slats for additional control of the airflow and thrust of cross-flow fan system. Furthermore, while duct 300 is shown to have oppositely disposed intake and exhaust regions 302, 304, a duct of the present disclosure may have ducts in other locations and other orientations, including top ducts, bottom ducts, left ducts, right ducts, or any combination of two or more ducts disposed about a cross-flow fan assembly. Duct 300 can be rotatable about rotational axis R, which represents rotational axis R1 or R2 disclosed herein, so that thrust may be generated in a radial direction emitting from the rotational axis R.

Duct 300 may be used to achieve a pressure differential that allows for more efficient thrust. In some examples, an 80-100% improvement in thrust may be achievable using such a pressure differential.

Figure 10:
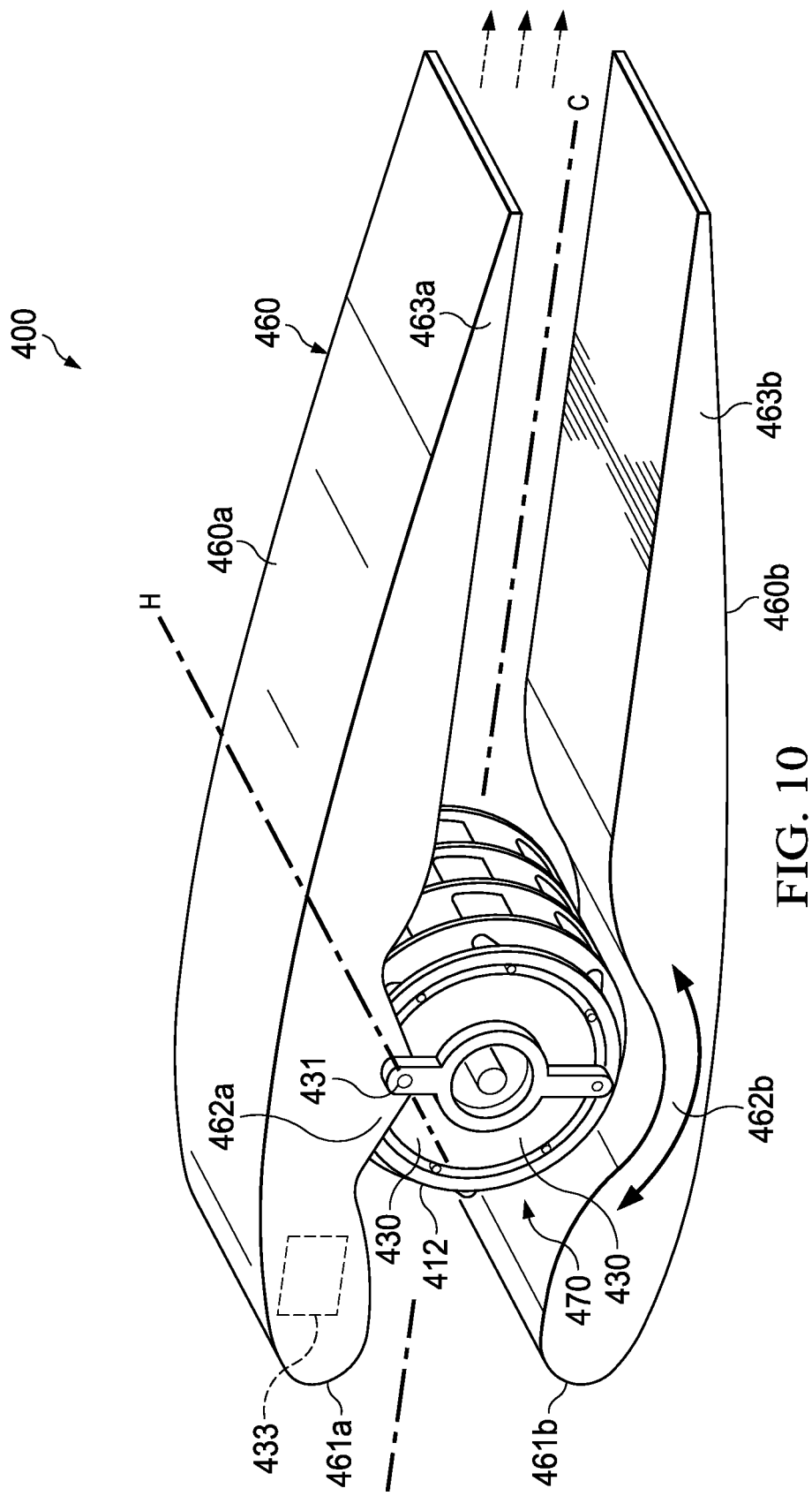
FIG. 10 is a schematic bottom view of a variable thrust cross-flow fan system in accordance with exemplary embodiments of the present disclosure.
Figure 11:
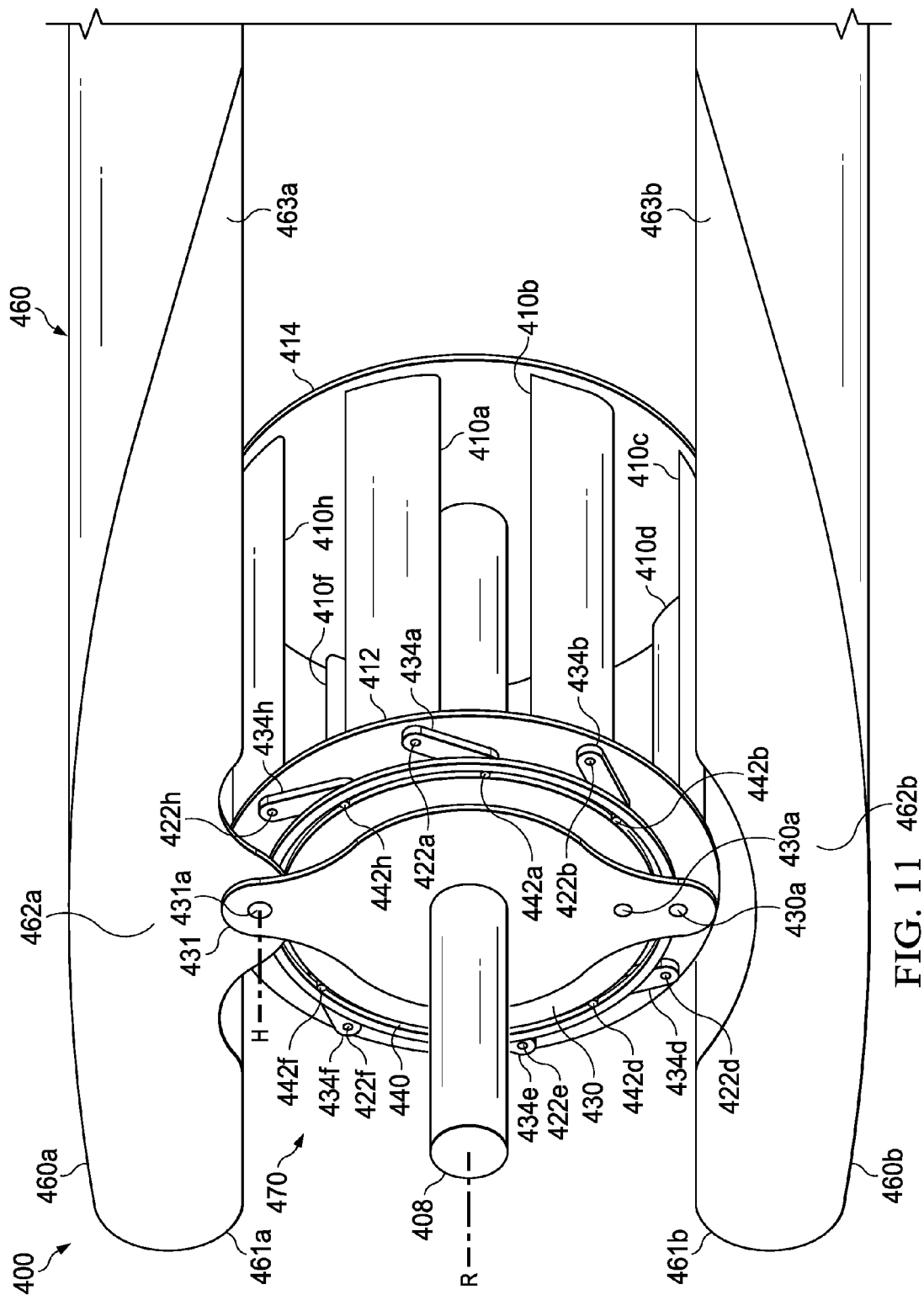
FIG. 11 is a schematic illustration of a variable thrust cross-flow fan system in accordance with exemplary embodiments of the present disclosure.

FIGS. 10-11 show schematic illustrations of a variable thrust cross-flow fan system and generally designated 400. The variable thrust cross-flow fan system 400 includes shroud 460 and variable thrust cross-flow fan assembly 470 according to an exemplary embodiment. Shroud 460 can have first housing member 460a and a second housing member 460b oriented generally parallel to each other. Each of the first and second housing members 460a, 460b includes an intake region 461a, 461b; a fan region 462a, 462b; and an exhaust region 463a, 463b.

FIG. 10 is a bottom schematic view of the variable thrust cross-flow fan system 400 such that the intake region 461a, 461b receives airflow therein and flows into the variable thrust cross-flow fan assembly 470 disposed in the fan regions 462a, 462b of the first and second housing members 460a, 460b. The variable thrust cross-flow fan assembly 470 generates a flow of air sufficient to generate a thrust force that exits between the exhaust regions 463a, 463b of the first and second housing members 460a, 460b. The first and second housing members 460a, 460b may be rotated by an actuator assembly 433. In other embodiments, the first and second housing members 460a, 460b can be oriented such that the exhaust regions 463a, 463b function as air intake, and the intake regions 461a, 461b function to direct thrust forces from the fan region 462a, 462b outward to exit the variable thrust cross-flow fan system 400.

Referring now to FIGS. 10-11, variable cross-flow fan assembly 470 includes a plurality of blades 410a-410h that rotate about a rotatable fan axis R and are rotatably coupled to driver plates 412, 414. Blades 410a-410h are fixably coupled to respective linkages 434a-434h via driver pins 422a-422h. In contrast to previously illustrated embodiments, control cam 430 is non-rotating relative to driver plates 412, 414 and drive shaft 408. Instead, control cam 430 includes one continuous follower slot 440 along which follower pins 422a-422h may move. A hinge member 431 is fixedly connected to control cam 430 by pins 430a and to the first housing member 460a by pin 431a. As the fan assembly 470 rotates to generate a thrust force, the exhaust regions 463a, 463b of the first and second housing members 460a, 460b direct the thrust force generally along an axis C, shown in FIG. 10.

To change direction of the thrust force, the first and second housing members 460a, 460b can be rotated by the actuator assembly 433. As the first housing member 460a is rotated by the actuator 433, the hinge member 431 is also rotated. The first housing member 460a can rotate about a hinge axis H that is independent of and about the rotatable fan axis R, which rotates the hinge member 431 and control cam 430. The rotation imparted by the first housing member 460a onto the hinge member 431 and the control cam 430 changes the direction of the thrust force to be oriented vertically for vertical flight mode.

Actuator assembly 433 is schematically shown and can be a linear actuator, a rotary actuator, or still another type of actuator device that can rotate the first housing member 460a. The actuator device may be powered hydraulically, electrically, or still otherwise powered. In an embodiment, the actuator assembly 433 rotates the housing member 460a, which is interconnected with the second housing member 460b. In an embodiment, the first housing member 460a and the second housing member 460b are in two-way communication between the slave and master. It is contemplated that actuator assembly 433 can be located on the second housing member 460b to impart rotation thereon, which can rotate the first housing member 460a. Still in other embodiments actuator assembly 433 can be disposed adjacent to, connected with, or as part of a rotatable drive shaft.

Together, hinge member 431, control cam 430, linkages 434a-434h, driver pins 422a-422h, and follower pins 442a-442h may be considered a control assembly coupled to blades 410a-410h. As described previously, movement of the control cam 430 by hinge member 431 can move blades 410a-410h into different pitch angle configurations to adjust the magnitude and direction of thrust. As discussed herein, there are an infinite number of pitch configurations of the blades 410a-410h. Advantageously, a separate system to power the control assembly is not required for the variable thrust cross-flow fan system 400.

Figure 12:
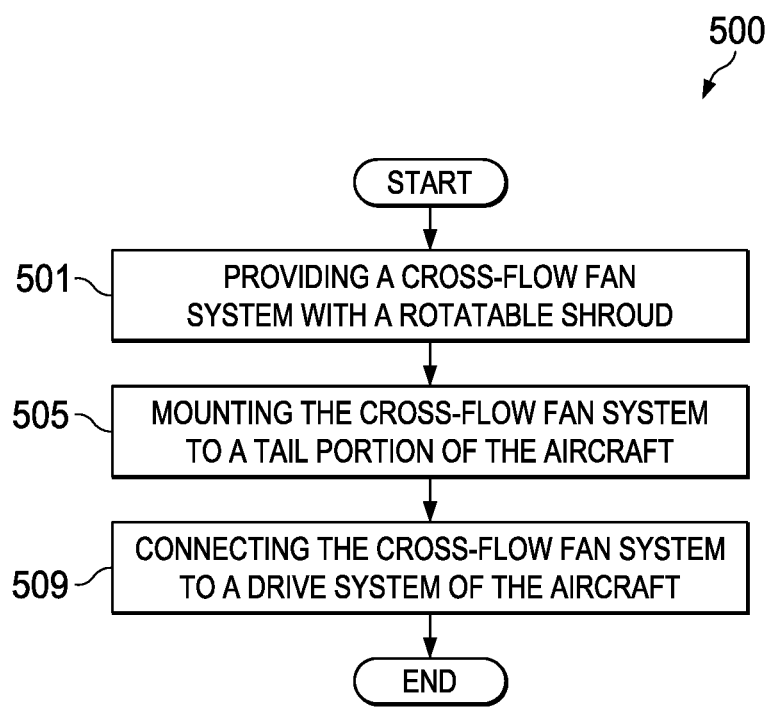
FIG. 12 is a flow diagram of a method of retrofitting an aircraft with a cross-flow fan system in accordance with exemplary embodiments of the present disclosure.

In an embodiment, the aircraft is manufactured to include at least one cross-flow fan system in a tail portion of the aircraft. Some embodiments of the disclosure can include a cross-flow fan system configured to be retrofittable onto an aircraft and methods of retrofitting an aircraft therewith. A cross-flow fan system configured to be retrofittable can include a variable thrust cross-flow fan assembly associated with a rotatable shroud as described herein. Referring to FIG. 12, a method of retrofitting an aircraft with a cross-flow fan system 500 can include a step 501 of providing a cross-flow fan system; a step 505 of mounting the cross-flow fan system to a tail portion of the aircraft 505; and a step 509 of connecting the cross-flow fan system to a drive system of the aircraft so that, during normal operation, the drive system provides power to the cross-flow fan system. It will be appreciated that the cross-flow fan system can be mounted to an existing aircraft in various locations, for example, to a side, top, or bottom surface of a fuselage and/or a tail portion of the aircraft.

While the illustrative embodiments are described for generating thrust and anti-torque forces for an aircraft, or for any object on which the variable thrust cross-flow fan system is mounted, the illustrative embodiments may also be used as a turbine in, for example, a generator. In these alternative embodiments, the pitch angle configuration of the blades may be changed in order to most effectively receive or harness a fluid, such as air or water, to turn the cross-flow fan assembly in a manner that produces energy.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

The invention claimed is:

1. An aircraft, comprising:
   a fuselage having a longitudinal axis extending from a front portion through an aft portion;
   a tailboom extending from the aft portion of the fuselage;
   first and second horizontal tail members extending from the tailboom;
   a first cross-flow fan system rotatably mounted and oriented generally vertically on the first horizontal tail member, the first cross-flow fan system rotates about a first rotation axis, the first cross-flow fan system includes a first rotatable shroud rotatable about the first rotation axis; and
   a second cross-flow fan system rotatably mounted and oriented generally vertically on the second horizontal tail member, the second cross-flow fan system rotates about a second rotation axis, the second cross-flow fan system includes a second rotatable shroud rotatable about the second rotation axis;
   wherein the first and the second rotation axes are generally parallel.

2. The aircraft according to claim 1, wherein the first and second cross-flow fan systems are configured to provide a forward thrust vector on the aircraft.

3. The aircraft according to claim 1, wherein the first and second cross-flow fan systems are configured to provide yaw control for the aircraft.

4. The aircraft according to claim 1, wherein the first and second cross-flow fan systems are configured to provide an anti-torque vector on the aircraft.

5. The aircraft according to claim 1, wherein the first and second rotational axes are disposed on a distal end of the respective first and second horizontal tail member.

6. The aircraft according to claim 5, wherein the rotational axis is generally perpendicular to the longitudinal axis of the fuselage.

7. The aircraft according to claim 5, wherein the first and second rotatable shrouds are selectively and independently rotated.

8. The aircraft according to claim 1, wherein the first and second cross-flow fan systems each comprise a variable thrust cross-flow fan assembly associated the respective rotatable shroud.

9. The aircraft according to claim 8, wherein the variable thrust cross-flow fan assembly comprises at least one variable thrust cross-flow fan assembly unit.

10. The aircraft according to claim 9, wherein the variable thrust cross-flow fan assembly unit having a longitudinal axis and including a first and second driver plates having a plurality of blades rotatably mounted therebetween, the plurality of blades disposed radially outwardly from the longitudinal axis such that the plurality of blades have a generally circular path of travel when the cross-flow fan assembly rotates about the longitudinal axis, the plurality of blades moveable between a plurality of pitch angle configurations, and a control assembly coupled to the plurality of blades, the control assembly operable to change the pitch angle configuration of the plurality of blades to generate a variable thrust.

11. The aircraft according to claim 10, wherein the control assembly further comprises a control cam that is operable to rotate relative to the first and second driver plates.

12. The aircraft according to claim 10, wherein the control assembly further comprises a control cam that is substantially non-rotatable relative to the first and second driver plates.

13. The aircraft according to claim 10, wherein the longitudinal axis of the variable thrust cross-flow fan assembly is perpendicular to the longitudinal axis of the fuselage.

14. The aircraft according to claim 8, wherein the longitudinal axis of the variable thrust cross-flow fan assembly intersects a plane transverse of the fuselage longitudinal axis.

15. The aircraft according to claim 8, wherein the first and second rotatable shrouds each comprise an outer housing and an inner housing, each of the outer housing and the inner housing having an exterior aerodynamic surface, each of the outer housing and inner housing are arranged concentric to the respective first rotational axis and second rotational axis.

16. An aircraft, comprising:
a fuselage having a longitudinal axis extending from a front portion through an aft portion;
first and second horizontal tail members extending from the aft portion;
a first cross-flow fan system rotatably mounted and oriented generally vertically on the first horizontal tail member; and
a second cross-flow fan system rotatably mounted and oriented generally vertically on the second horizontal tail member;
wherein the first and second cross-flow fan systems each comprise a variable thrust cross-flow fan assembly associated with a shroud, the variable thrust cross-flow fan assembly comprises at least one variable thrust cross-flow fan assembly unit;
wherein the variable thrust cross-flow fan assembly unit having a longitudinal axis and including a first and second driver plates having a plurality of blades rotatably mounted therebetween, the plurality of blades disposed radially outwardly from the longitudinal axis such that the plurality of blades have a generally circular path of travel when the cross-flow fan assembly rotates about the longitudinal axis, the plurality of blades moveable between a plurality of pitch angle configurations, and a control assembly coupled to the plurality of blades, the control assembly operable to change the pitch angle configuration of the plurality of blades to generate a variable thrust, the control assembly further comprises a control cam that is operable to rotate relative to the first and second driver plates.

17. The aircraft according to claim 16, wherein the first and second cross-flow fan systems are configured to provide a forward thrust vector on the aircraft.

18. The aircraft according to claim 16, wherein the first and second cross-flow fan systems are configured to provide yaw control for the aircraft.

19. The aircraft according to claim 16, wherein the first and second cross-flow fan systems are configured to provide an anti-torque vector on the aircraft.

20. The aircraft according to claim 16, wherein the first and second cross-flow fan systems are each configured to rotate about a rotational axis that is generally perpendicular to the longitudinal axis of the fuselage.

21. The aircraft according to claim 16, wherein the first and second cross-flow fan systems each comprise the variable thrust cross-flow fan assembly associated with a first and second rotatable shroud, respectively.

22. The aircraft according to claim 21, wherein the first and second rotatable shrouds are selectively and independently rotated.

23. The aircraft according to claim 21, wherein the first and second rotatable shrouds each comprise an outer housing and an inner housing, each of the outer housing and the inner housing having an exterior aerodynamic surface, each of the outer housing and inner housing are arranged concentric to the respective first rotational axis and second rotational axis.

* * * * *